(12) United States Patent
Konishi et al.

(10) Patent No.: US 6,208,385 B1
(45) Date of Patent: Mar. 27, 2001

(54) LETTERBOX IMAGE DETECTION APPARATUS

(75) Inventors: Kazuo Konishi; Naoki Akamatsu; Kohichi Satoh, all of Kanagawa-ken (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 08/953,486

(22) Filed: Oct. 17, 1997

(30) Foreign Application Priority Data

Oct. 17, 1996 (JP) .................................................. 8-274444
Jan. 28, 1997 (JP) .................................................. 9-014168
Apr. 11, 1997 (JP) .................................................. 9-093789

(51) Int. Cl.$^7$ ..................................................... H04N 5/46
(52) U.S. Cl. ............................. 348/558; 348/556; 348/913
(58) Field of Search ................................. 348/913, 445, 348/558, 556, 625; H04N 5/46, 7/01

(56) References Cited

U.S. PATENT DOCUMENTS 5,486,871 * 1/1996 Filliman .............................. 348/558

FOREIGN PATENT DOCUMENTS 7-87416    3/1995 (JP) .

* cited by examiner

Primary Examiner—Sherrie Hsia
(74) Attorney, Agent, or Firm—Pillsbury Winthrop

(57) ABSTRACT

A letterbox image detection apparatus for detecting a letterbox image by detecting a boundary of an image area and a non-image area, so as to display the image area on a full screen according to the detection result but not to display the non-image area. The apparatus includes timing pulse generator for generating a timing pulse for splitting one screen image into N columns (N is an integer of 2 or more), image property calculator for calculating the image property of the N horizontal sections (hereinafter referred to as columns) split by the timing pulse generator, inter-line difference calculator for calculating the inter-line difference of the N image properties, edge detector for comparing the inter-line difference with a predetermined upper first threshold th1 and for detecting the edge, and edge position data holder for holding the vertical position data of the in-column edge detected by the edge determinator.

6 Claims, 33 Drawing Sheets

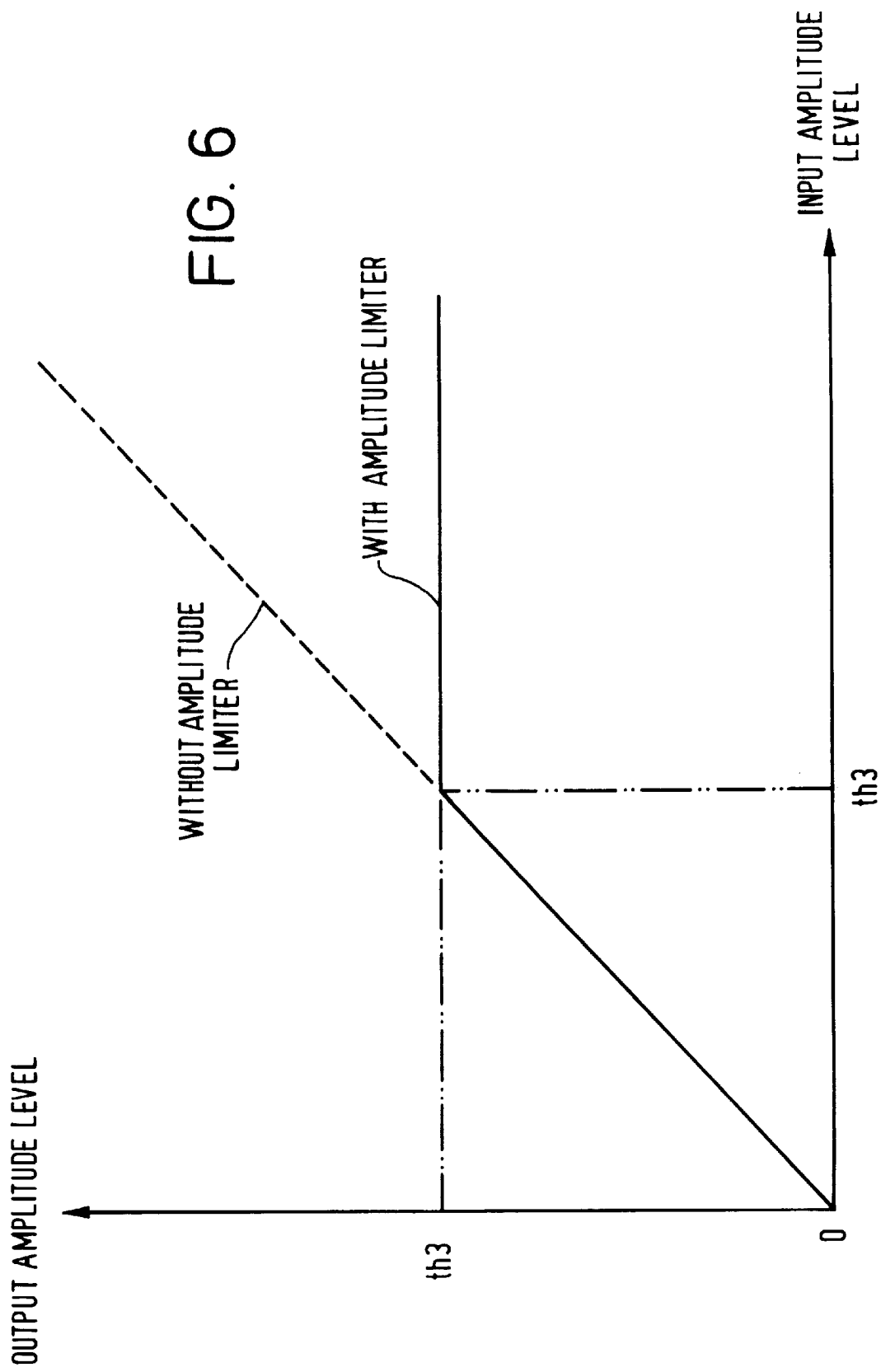

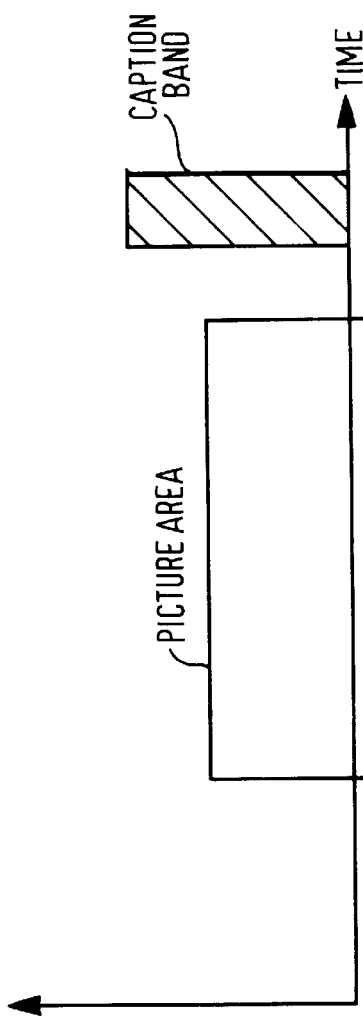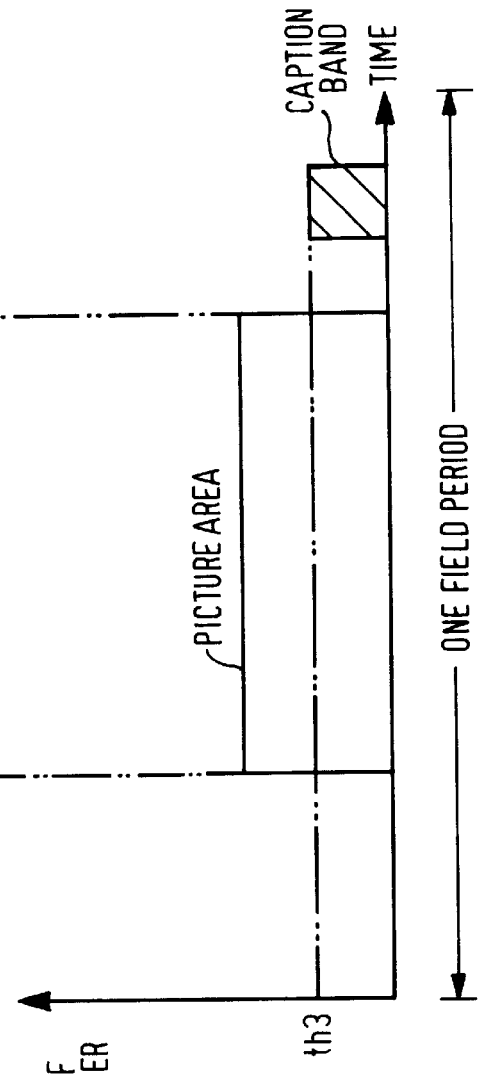

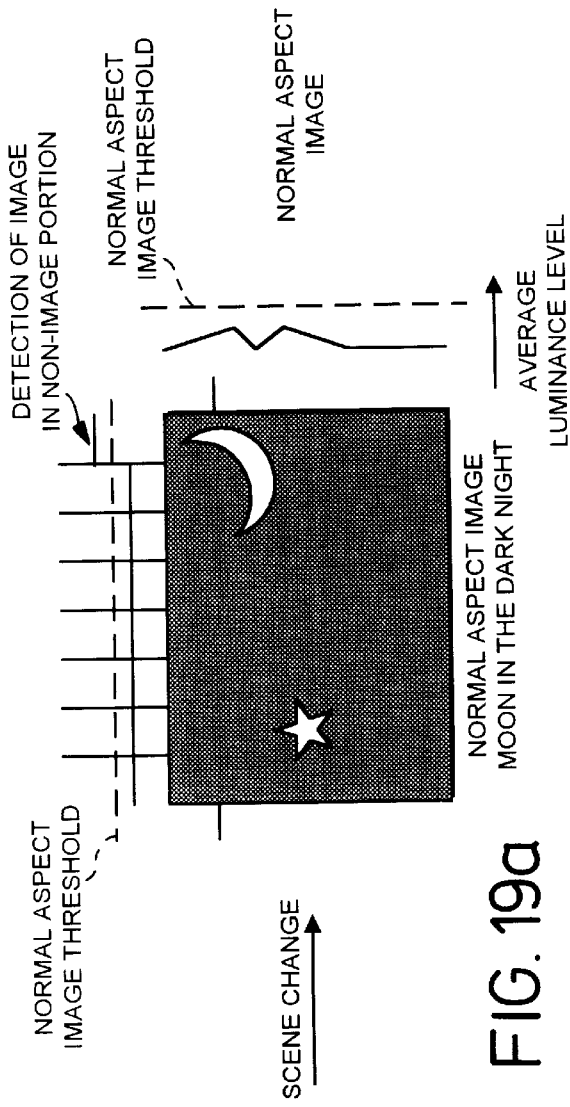
FIG. 19a
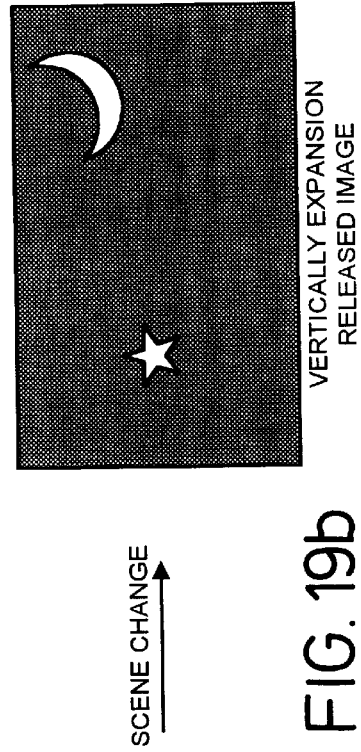
FIG. 19b
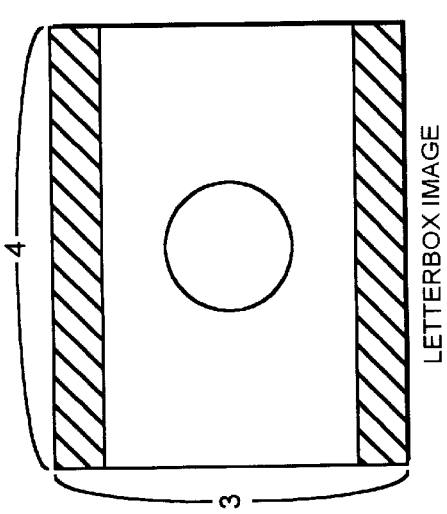
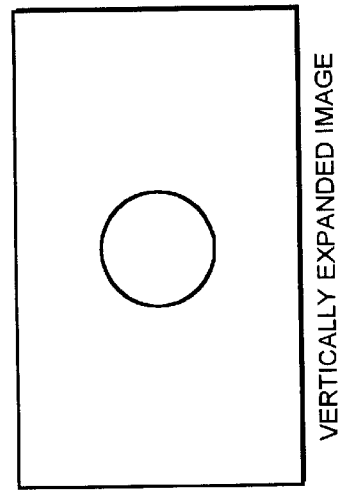

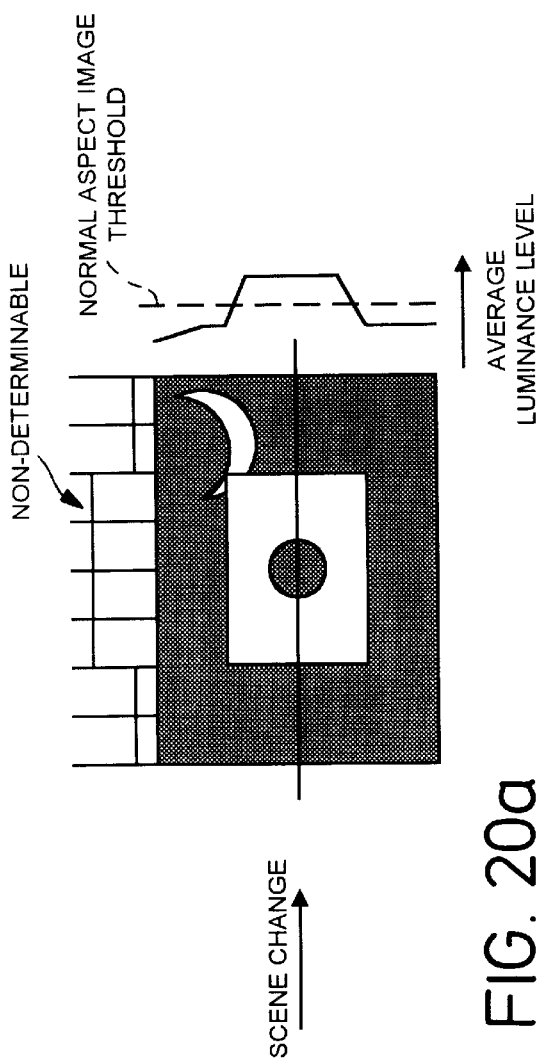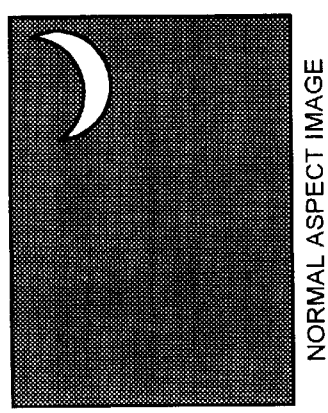
FIG. 20a
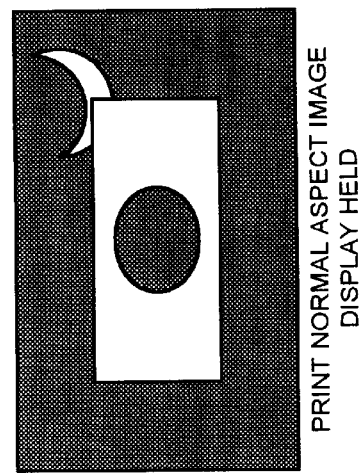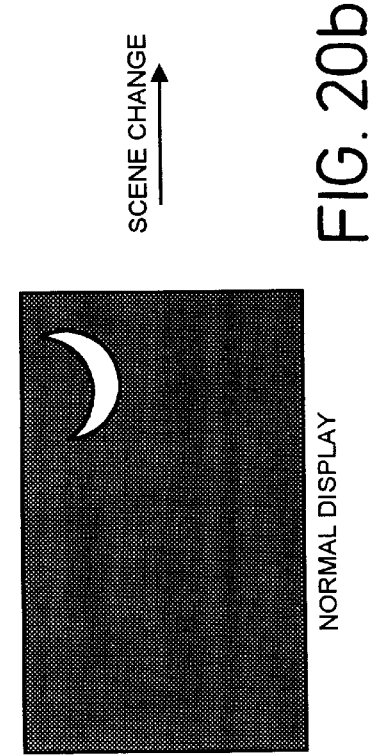
FIG. 20b

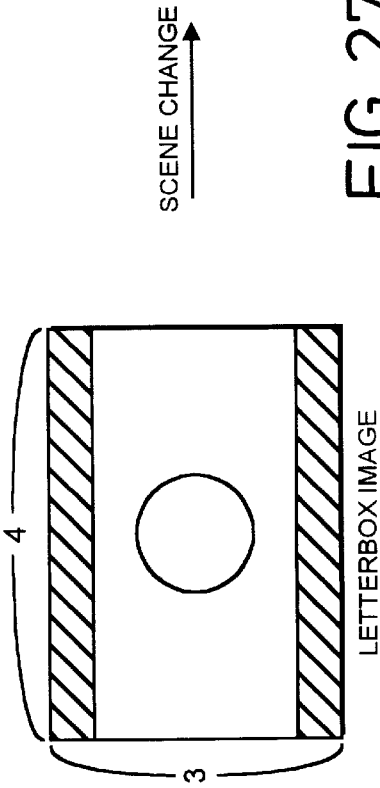
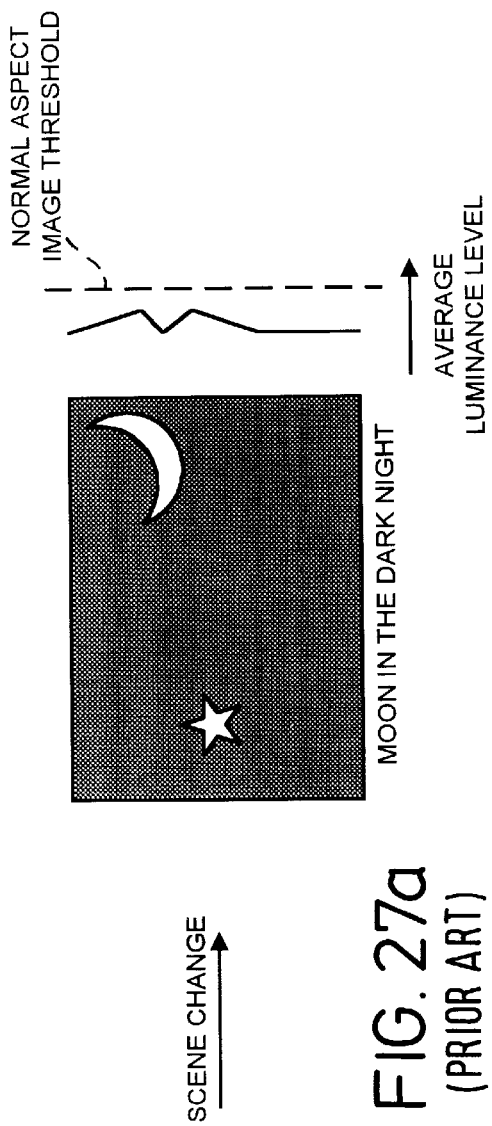
FIG. 27a (PRIOR ART)
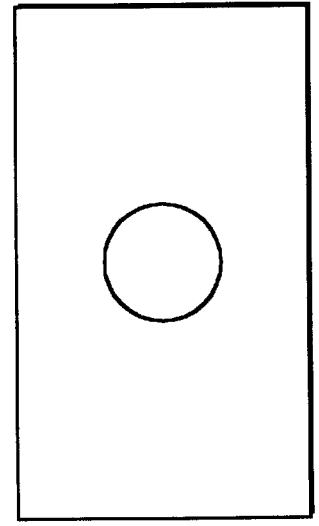
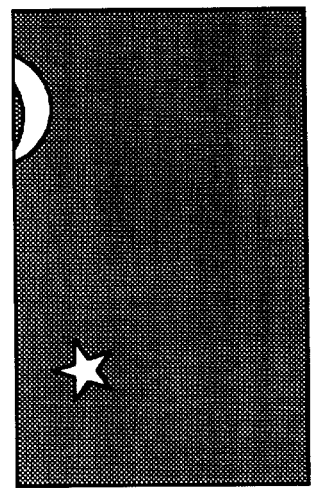
FIG. 27b (PRIOR ART)

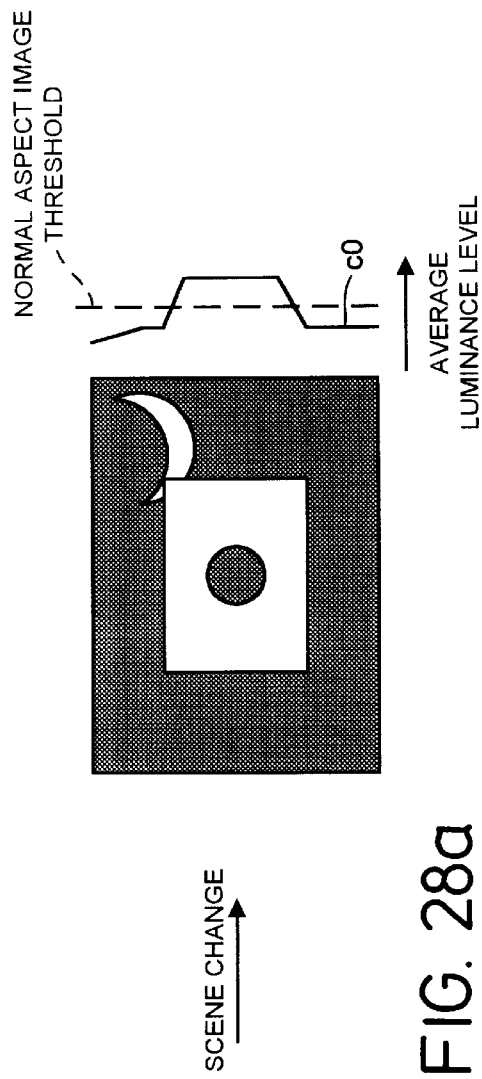
FIG. 28a (PRIOR ART)
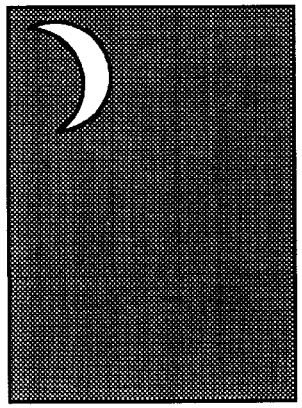
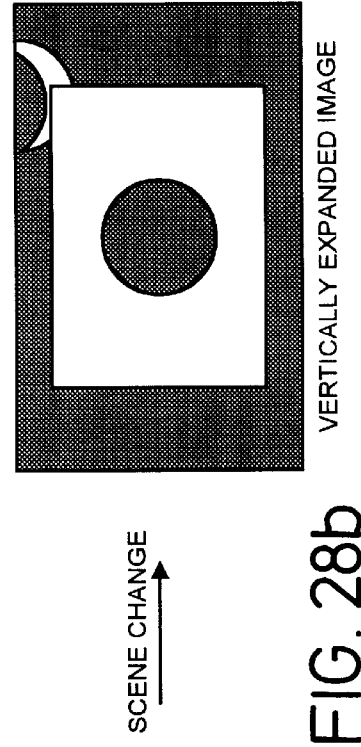
FIG. 28b (PRIOR ART)
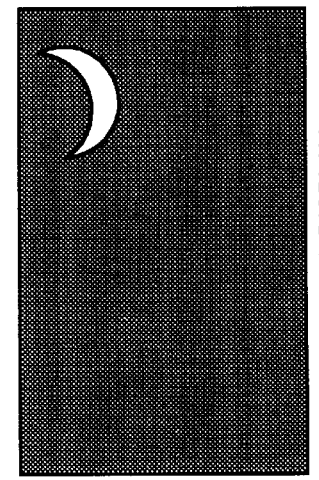

LETTERBOX IMAGE DETECTION APPARATUS

FIELD OF THE INVENTION

The present invention generally relates to a letterbox image detection apparatus for detecting a letterbox image signal.

The present invention relates to a letterbox image detection apparatus which is utilized in TV receivers having a wide aspect screen for detecting boundary position data of central main images and matte tops or bottoms of screen images, so as to block out the matte tops and bottoms from the display screen and thus to expand the main image on the whole display screen.

BACKGROUND OF THE INVENTION

In recent years, 16:9 wide aspect TV receivers have been widely in use to add realism of theater for audiences at home.

Recently, video softwares adapted for broadcast systems represented by wide-clear visions, VTRs, laser discs, etc. have been widely used.

EDTV-II type broadcasts are adapted for displaying on 16:9 aspect screens. While some of movies or the like recorded in laser discs and video tapes have a screen aspect wider than the 4:3 standard aspect screen as employed in the conventional TV receivers These wide aspect programs are transmitted through a TV broadcast signal so-called letterbox image which is formed by a central image area (hereinafter referred to main image) and black belt-shape non-image areas which are disposed at the top and bottom of the main image. In such wide aspect TV receivers there are many ones which have functions of letterbox image detections, i.e., a function of detecting boundaries of the main images and the non-image areas and then blocking out the non-image areas from the display screen and thus expanding the main image both in the vertical and horizontal directions to display on the full screen of the TV receivers.

FIGS. 23a and 23b are an explanatory diagrams showing an image display for video softwares compatible with conventional wide aspect TV receivers. Wherein FIG. 23a shows an image displayed on the 4:3 aspect screen. While FIG. 23b shows the same image displayed on the 16:9 aspect screen.

In FIGS. 23a and 23b, a video software compatible with a wide aspect TV receiver provides a black band (hereinafter referred to the non-image area) on the top and bottom of the central letterbox image to maintain a compatibility with the 4:3 aspect image from the viewpoint of relationship with the current 4:3 aspect image signal as shown in FIG. 23a. Such picture is called a letterbox image. A wide aspect TV receiver has a function to detect a letterbox image and expand the picture in the vertical direction (called as a vertical expansion) so that the top and bottom non-image areas are not visible as shown in FIG. 23b when such a letterbox image is provided.

FIGS. 24a and 24b are explanatory diagrams showing a conventional image display with a caption band superposed on the lower non-image area against a video software compatible with wide aspect TV receivers. Wherein FIG. 24a shows an image displayed on the 4:3 aspect screen. While FIG. 24b shows an image displayed on the 16:9 aspect screen.

As shown in FIG. 24a, when an image with a caption band superposed on the lower non-image area is displayed on the 4:3 aspect screen, the caption band is displayed as it is, on the other hand, as shown in FIG. 24b, when an image is displayed on the 16:9 aspect screen, the vertical expansion is made likewise but in order to prevent the caption band from becoming invisible, the image is expanded to the upper non-image area and the lower portion of the caption band.

To make this operation, most wide aspect TV receivers includes a letterbox image detector for detecting a letterbox image signal.

FIG. 25 is an explanatory diagram showing features of a letterbox image.

In FIG. 25, a first feature of the letterbox image is that there are the non-image areas on the top and bottom of the letterbox image.

A second feature is that the boundary of the non-image area and the picture area (hereinafter referred to the main image) is sharp and expands across one screen image.

A third feature is that there is the main image laterally expanding around the center of the screen.

When such the first through third features are all satisfied, the letterbox image detection apparatus determines that a picture is a letterbox image.

The letterbox image detection apparatus discriminates between a picture is a letterbox image and a normal aspect image by obtaining an average luminance level and an average chrominance level across one screen image for one screen and by considering an accumulation of that value for one screen. In general, a large accumulation for several fields or frames is performed for determining whether a small accumulation across only one field or frame has stably the feature of the letterbox image, the determination is made using. In the example shown in FIG. 25, an accumulation a0 of an average luminance level and an average chrominance level satisfies all the conditions for the letterbox image and are stable over several pictures, it is determined to be a letterbox image and a microcomputer in a TV receiver is directed to perform the vertical expansion. Further, at the same time, when an accumulation of image signal of the aspect ratio 4:3 having a picture which is not a letterbox image, that is, having a picture in the non-image area (hereinafter referred to as a normal aspect image) is obtained, the letterbox image detection apparatus regards it as a normal aspect image and conveys the cancellation of the vertical expansion to the main microcomputer. If a picture cannot be determined to be a letterbox image or a normal aspect image, the picture is regarded as cannot be determined and the microcomputer is directed to maintain the current state.

FIG. 26 shows an example of a letterbox image containing a caption band.

In FIG. 26, in case of a picture which )as an edge at the lower side in the accumulation b0 of an average luminance level and an average chrominance Level for one screen and further, the luminance sharply changes in the lower non-image area, the letterbox image detection apparatus detects it and conveys that the picture is a letterbox image having a caption band to the main microcomputer. At the same time, the picture start and end position data and the caption band end position data are conveyed to the main microcomputer.

FIGS. 27a and 27b are an explanatory diagrams showing an example or a first erroneous detection of a conventional letterbox image detection apparatus.

In FIGS. 27a and 27b, a conventional letterbox image detection apparatus detects a letterbox image using an average luminance level and an average chrominance level across one screen image and therefore, when a scene changes, for instance, from a letterbox image to such a normal aspect image like the scene of the moon in a dark night as shown in FIG. 27a, the average luminance and average chrominance levels detected by the letterbox image detection apparatus are always below a threshold of a normal aspect image and the level becomes not that of a normal aspect image nor a letterbox image. As a result, the letterbox image detection apparatus outputs a determining impossible signal. Here, an ordinary vertical expansion condition when the determining is impossible is to maintain the current state and therefore, in case of the display on the 16:9 aspect screen, if an image before the scene change was fling away by a letterbox image, the display on the screen remains unchanged and an image chipping occurs in the true display as shown in FIG. 27b.

FIGS. 28a and 28b are explanatory diagrams showing an example of a second erroneous detection of a conventional letterbox image detection apparatus.

In FIGS. 28a and 28b, an example of an erroneous operation reverse to the operation in FIGS. 27a and 27b is shown. As shown in FIG. 28a, if a scene was changed from a normal aspect image (on a normal aspect display) of the scene of the moon in the dark night to a scene of the sun appearing at the center, the accumulation c0 satisfies all of the features of the letterbox image at the average luminance and chrominance levels across one screen image. In this case, the output from the letterbox image detection apparatus becomes a letterbox image and when displaying in the 16:9 aspect screen, there was such a defect that the picture was vertically expanded in spite of a normal aspect image and also an image chipping occurs.

FIG. 29 shows an arrangement of the conventional letterbox image detection apparatus.

Initially, in the interests of simplification it is assumed that a screen image having a uniform luminance like a letterbox image without caption bands is provided. This case of letterbox image is shown in FIG. 30f, which has the conventional 4:3 aspect ratio of TV receivers (here, no caption bands are included).

The luminance signal of the screen image is applied to the average value calculator 901. In response to the horizontal sync signal and the vertical sync signal, a clock pulse generator 902 generates a clear pulse (see FIG. 30g) for clearing the average value calculator 901 just before the start of every field and an average value calculation range pulse (see FIG. 30h) for showing the effective image period to the average value calculator 901. The average value calculator 901 outputs the average of the luminance signal level for each one-horizontal period (see FIG. 30c).

The output from the average value calculator 901 is applied to the input terminal of a 1H delay unit 903 and the non-inverted input terminal of a subtracter 904. On the other hand, the output from the 1H delay unit 903 is applied to the inverted input terminal of the subtractor 904. The subtractor 904 calculates a difference by a subtraction, i.e., [luminance average of current line–luminance average of 1H prior line], and supplies the calculated difference to one input of a comparator 905 (see FIG. 30b).

While the other input terminal of the comparator 905 is supplied with an upper first threshold th1 (th1 has a positive value) generated in a threshold generator 906 (see FIG. 30b). The comparator 905 provides an upper edge detection signal detected in a predetermined column to the line position data holder 907, when the difference is higher than the upper first threshold th1. The comparator 905 also provides the lower edge detection signal detected in a prescribed column to the line position data holder, when the difference is lower than the lower first threshold −th1.

A line position data generator 908 generates a line position data corresponding to the vertical position data of the screen image from the horizontal sync signal and the vertical sync signal as its input, and supplies the line position data to the line position data holder 907 (see FIG. 30a).

The line position data holder 907 holds the line position data which is found first at the field in regard to the upper edge, and holds the line position data which is found last at the field in regard to the lower edge. Accordingly, in this case, the line position data held in the line position data holder 907 has a value v1 for the upper edge and a value v2 for the lower age, as shown in FIG. 30a. These edges indicate boundaries of the non image areas and the central main image, that is the top and bottom lines or the screen image, which are operating normally.

The holding value of the line position data holder 907 is initialized to the invalid line position data value before the effective image period of the field. Since the line position data value remains the invalid line position data value when the edge in not found, the holding value is determined by the presence of the edge and the line position data holding the vertical position data. When both top and lower edge line position data holding values are valid, the screen image of the field is determined as the letterbox image.

Next, it is assumed that a letterbox image with an unchanged central main image and a caption band in a bottom non-image area, e.g., a letterbox image as shown in FIG. 30f containing a caption band. Here, the output from the average value calculator 901 will be a waveform as shown in FIG. 30d.

Since the caption band has generally a higher luminance level, the luminance level of the caption band often becomes higher than the line average luminance level of the central main image. In this case, as shown in FIG. 30e, the upper edge is normally detected as that of the main image at the level of value v1. However, the lower edge is detected as a lower edge of the caption band at the level of value v3, but not the lower edge of the main image at the level of the value v2.

According to this calculation, the caption band is determined as it contained in the central main image, so that it is impossible to operate the caption band moving function for displaying the central main image operated by using the caption band position data detector output (not shown) on a full screen and the main circuit output, and for moving the caption band to the central main image from the non image, or the caption band compression function for relatively compressing the caption band of the non image so as to display the compressed caption band on the central main image.

If an approach of holding the edge position data before the caption band is attempted, when a scene changes from a 4:3 aspect image to a letterbox image with a caption band, the picture area top and bottom line of the former letterbox image is not held so that following undesirable operations will be occurred.

After the screen image with the caption band is displayed on a full screen at the vertical position data, the screen image changes to be displayed between the true picture area top and bottom lines when the caption band disappears. Then when the caption band is appear again the screen image changes to the image display having the caption band again, so that it is hard to see because of the repeated display change in the short time.

Besides, since the edge is determined by the inter-line difference of the line luminance average, a part of the screen image where the luminance as high partially is detected as the letterbox image incorrectly (see FIG. 31), or an area having an entirely low luminance moves in the lateral direction is not detected as the letterbox image even it is moving horizontally (see FIG. 32).

Further, there is a problem that it is a letterbox image but its top and bottom lines run across several lines not parallel to the scanning line, so that it is not detected (see FIG. 33).

The conventional letterbox image detection apparatus has a problem of wrongly detecting the letterbox image, when a scene changes to an image having the luminance level of black or close to it like a scene of the moon in the dark night or when an image of high luminance level is superposed on the center of an image of the luminance level of black or close to it.

The conventional letterbox image detection apparatus has also a problem that it can not detect the true top and bottom picture area end data when there is the caption band, or commits an error in discrimination of letterbox image or other image for the images as shown in FIGS. 31 through 33.

SUMMARY OF THE INVENTION

It is, therefore, an object of the present invention to provide a letterbox image detection apparatus, and more particularly, a letterbox image detection apparatus which is capable of preventing the erroneous letterbox image signal detection when a scene changes to an image having the luminance level of black or close to it or when an image of high luminance level is superposed on the center of an image of the luminance level of black or close to it.

Another object of the present invention is to provide a letterbox image detection apparatus capable of detecting the true top and bottom picture area and data even there is the caption band.

It is a further object or the present invention to provide a letterbox image detection apparatus capable of discriminating whether the screen images as shown in FIGS. 31 through 33 are the letterbox image or not.

In order to achieve the above object, a letterbox image detection apparatus for detecting a letterbox image by detecting a boundary of an image area and a non-image area, so as to display the image area on a full screen according to the detection result but not to display the non-image area according to first aspect of the present invention includes timing pulse generating means for generating a timing pulse for splitting one screen image into N columns (N is an integer of 2 or more), image property calculation means for calculating the image property of the N horizontal sections, i.e., N columns split by the timing pulse generator, inter-line difference calculation means for calculating the inter-line difference of the N image properties, edge detecting means for comparing the inter-line difference with a predetermined upper first threshold th1 and for detecting the edge, and edge position data holding means for holding the vertical position data of this in-column edge detected by the edge determinator.

A second aspect of the letterbox image detection apparatus for detecting a letterbox image by detecting a boundary of an image area and a non-image area, so as to display the image area on a full screen according to the detection result but not to display the non-image area having timing pulse generating means for generating a timing pulse for splitting one screen image into N columns (N is an integer of 2 or more), first image property calculation means for calculating the image property of the N columns (hereinafter referred to as a column) split by the timing pulse generator, inter-line difference calculation means for calculating the inter-line differences of the image property for the N columns, edge detecting means for detecting the edge by comparing the inter-line difference with the upper first threshold th1, edge counting means for counting in-column edges across one screen image, N unit of edge (M is an integer defined by $2 \leq M \leq N$) vertical position data holding means for holding the vertical position data where the corresponding edge is detected last, second image property calculation means for calculating the image property of the input image signal, edge count threshold control means for changing the edge count threshold to which M units of edge position data holding means correspond in response to the second image property, and vertical position data selecting means for selectively outputting the vertical position data detected the highest one of one or several vertical position data detected last by the edge position data holding means.

A third aspect of the letterbox image detection apparatus for detecting a letterbox image by detecting a boundary of an image area and a non-image area, so as to display the image area on a full screen according to the detection result but not to display the non-image area, having timing pulse generating means for generating a timing pulse for splitting one screen image into N columns (N is an integer of 2 or more) first image property calculation means for calculating the image property of the N columns (hereinafter referred to as a column) split by the timing pulse generator, inter-line difference calculation means for calculating the inter-line differences of the image property for the N columns, edge detecting means for detecting the edge by comparing the inter-line difference with the upper first threshold th1, edge counting means for counting in-column edges across one screen image, M units of edge (M in an integer defined by $2 \leq M \leq N$) vertical position data holding means for holding the vertical position data where the corresponding edge is detected last, second image property calculation means for calculating the image property of the input image signal, edge count threshold control means for changing the edge count threshold to which M units of edge position data holding means correspond in response to the second image property, and vertical position data selecting means for selectively outputting the vertical position data detected the lowest among one or several vertical position data detected first by the edge position data holding means.

A fourth aspect of the letterbox image detection apparatus for detecting a letterbox image by detecting a boundary of an image area and a non-image area, so as to display the image area on a full screen according to the detection result but not to display the non-image area, having timing pulse generating means for generating a timing pulse for splitting one screen image into N columns (N is an integer of 2 or more), first image property calculation means for calculating the image property of each image levels of the N columns (hereinafter referred to as a column) split by the timing pulse generator, inter-line difference calculation means for calculating the inter-line difference of the N image properties, edge detecting means for detecting the edge by comparing the inter-line difference with the upper first threshold th1, vertical position data holding means for holding the vertical position data of the edge detected by the edge determinator, second image property calculation means for calculating the predetermined image property of the input image signal, and column numbers control means for controlling the number of columns (N) for splitting a screen image according to the second image property.

A fifth aspect or the letterbox image detection apparatus for detecting a letterbox image by detecting a boundary of an image area and a non-image area, so as to display the image area on a full screen according to the detection result but not to display the non-image area, having timing pulse generating means for generating a timing pulse for splitting one screen image into N columns (N is an integer of 2 or more), first image property calculation means for calculating the image property of each image levels of the N columns thereinafter referred to as a column) split by the timing pulse generator, inter-line difference calculation means for calculating the inter-line difference of the N image properties, edge detecting means for detecting the edge by comparing the inter-line difference with the upper first threshold th1, edge counting means for counting in-column edges across one screen image, edge position data holding means for holding the vertical position data when a count of the in-column edges larger than the predetermined edge count threshold are detected, edge position data holding means for holding the horizontal position data when a count of the in-column edges larger than the predetermined edge count threshold are detected, edge position data updating means for updating the position data holding means to a newly detected edge position data when the corresponding edge counts more than the edge counts held in the edge position data holding means are detected in regard to the upper edge.

A sixth aspect of the letterbox image detection apparatus for detecting a letterbox image by detecting a boundary of an image area and a non-image area, so as to display the image area on a fall screen according to the detection result but not to display the non-image area, having timing pulse generating means for generating a timing pulse for splitting one screen image into N columns (N is an integer of 2 or more) first image property calculation means for calculating the image property or each image levels, of the N columns (hereinafter referred to as a column) split by the timing pulse generator, inter-line difference calculation means for calculating the inter-line difference of the N image properties, edge detecting means for detecting the edge by comparing the inter-line difference with the upper first threshold th1, edge counting means for counting in-column edges across one screen image, edge position data holding means for holding the vertical position data when the corresponding edge count are detected, edge position data holding means for holding the horizontal position data of the edge where the corresponding edge count are detected, and edge position data updating means for updating the edge position data which is held in the edge position data holding means and the edge position data which is held in the edge position data holding means when the corresponding edge count about the lower edge are detected, which are more than the edge count held in the edge position data holding means.

A seventh aspect of the letterbox image detection apparatus of the present invention includes means for splitting a screen image into two or more columns, a first detecting means for detecting a picture area in each column split by the splitting means, a second detecting means for detecting a sudden change of image in each column by checking an inter-line correlation in each column split in a screen image the splitting means, a third detecting means for detecting a caption band in each column split by the splitting means, and an overall detector for finally detecting a letterbox image signal.

Additional objects and advantages of the present invention will be apparent to persons skilled in the art from a study of the following description and the accompanying drawings, which are hereby incorporated in and constitute a part of this specification.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 6 is an image characteristic diagram showing one example of the input/output image property of the nonlinear processor 207 (amplitude limiter) in FIG. 5;

FIG. 7 is an image characteristic diagram showing one example of the input/output image property of the nonlinear processor 207 (amplitude limiter) in FIG. 5;

FIG. 19 is an explanatory diagram showing a first example of the detection by the letterbox image detection apparatus shown in FIG. 17;

FIG. 20 is an explanatory diagram showing a second example of the detection of the letterbox image detection apparatus shown in FIG. 17;

FIG. 27 is an explanatory diagram showing an example of a first example of the detection failure of a conventional letterbox image detection apparatus;

FIG. 28 is an explanatory diagram showing an example of a second example of the detection failure of a conventional letterbox image detection apparatus;

DESCRIPTION OF THE PREFERRED EMBODIMENTS

The present invention will be described in detail with reference to the FIGS. 1 through 22.

A first embodiment of the letterbox image detection apparatus according to the present invention will be described in reference to FIG. 1 through 4.

The first embodiment of the letterbox image detection apparatus is explained in reference the screen images he same images as used for explaining the conventional apparatus in the case of letterbox image having the caption band, as shown in FIGS. 30f and 2g.

Figure 1:
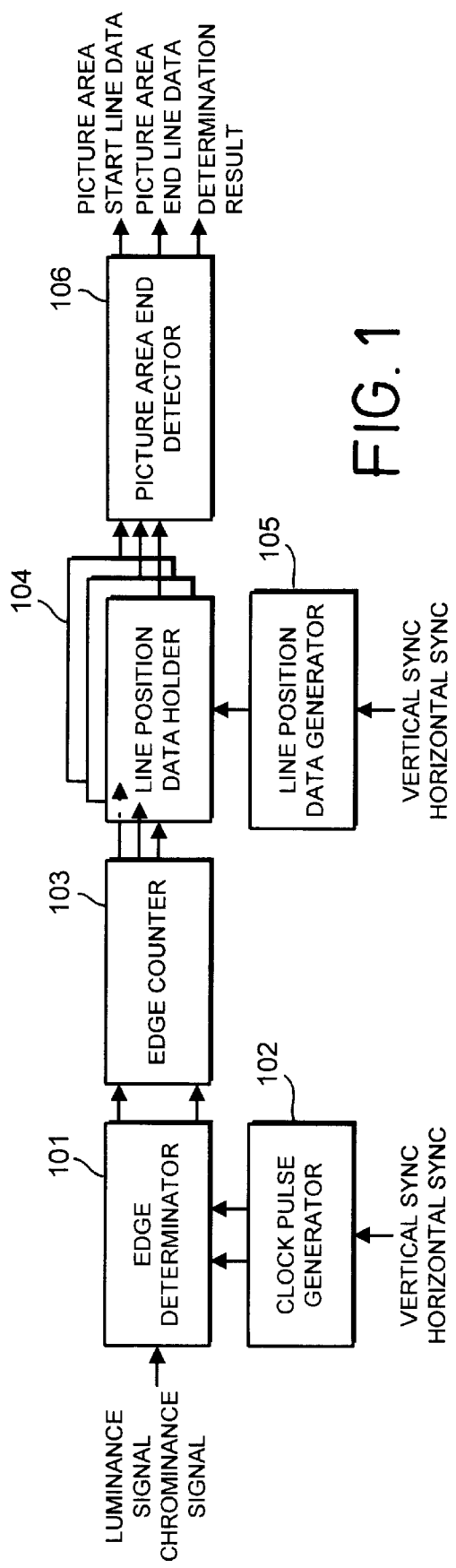
FIG. 1 is a block diagram showing a first embodiment of the letterbox image detection apparatus according to the present invention.
Figure 3:
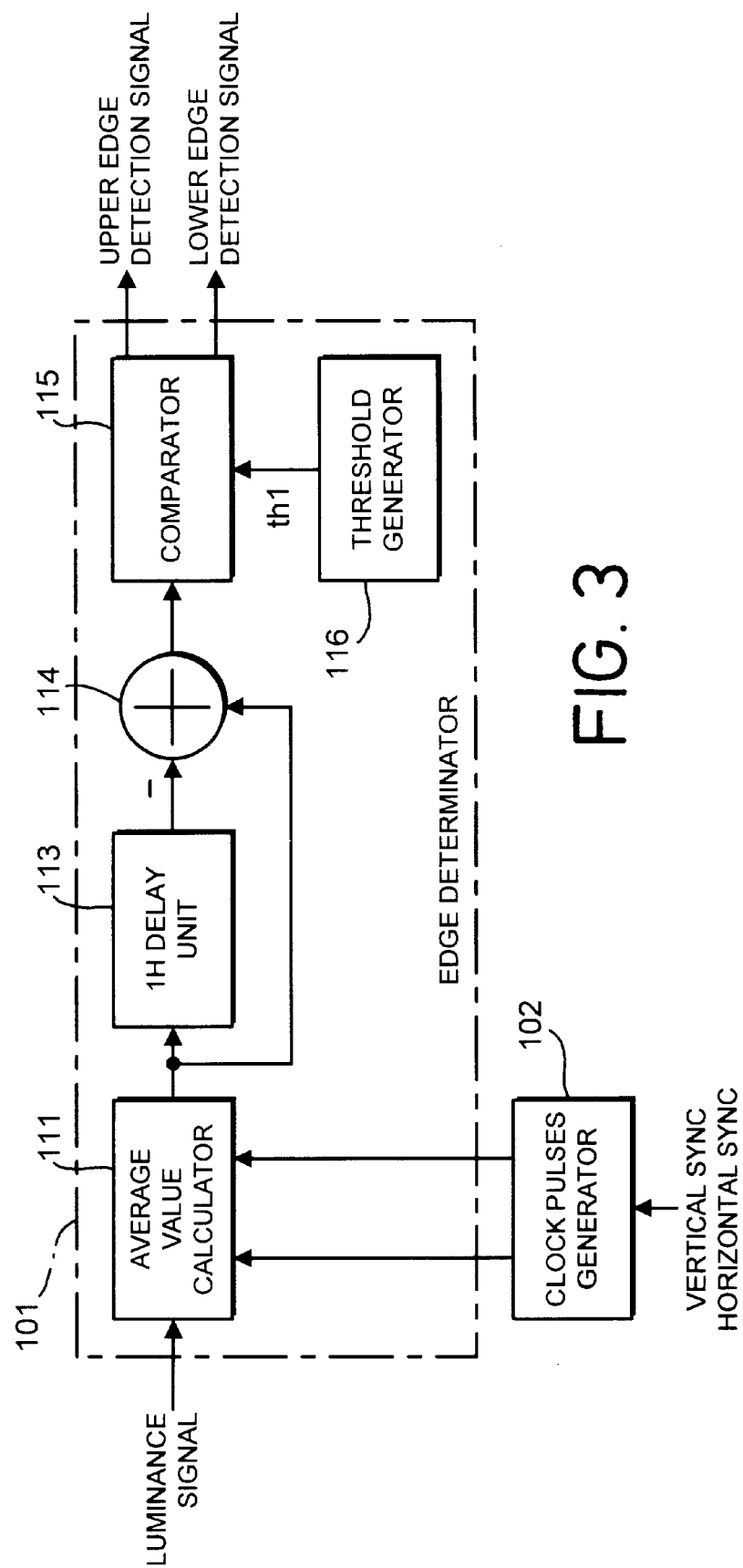
FIG. 3 is a block diagram showing the construction of the edge determinator 101 in FIG. 1.

In FIG. 1, the luminance signal of the screen image is applied to an edge determinator 101. The edge determinator 101 has a construction as shown in FIG. 3.

To a clock pulse generator 102 the horizontal sync signal and the vertical sync signal are input. And it outputs the clear pulse for clearing an average value calculator 111 shown in FIG. 3 (See FIG. 2e) and the average object interval pulse (see FIG. 2f) to the average value calculator 111 just before starting the each column for splitting the screen image into equal 8 columns. The average value calculator 111 outputs the average of the luminance signal levels for every column.

Since the input signal to the letterbox image detection apparatus is as same as the screen image explained in the conventional example shown in FIG. 30f, the uniform high luminance area in the central main image has the same average luminance as the conventional example. In FIG. 2g the boundaries of the columns are visualized by vertical solid lines for convenience' sake of explanation.

The output from the average value calculator 111 is applied to the input terminal of a one-horizontal period delay unit (hereinafter referred to 1H delay unit) 113 and to the non-inverted input terminal of a subtractor 114. On the other hand, the output from the 1H delay unit 113 is applied to the inverted input terminal of the difference device 114. The subtractor 114 calculates a difference by a subtraction of [luminance average of current column−luminance average of prior column, and supplies the calculated difference to one input terminal of a comparator 115.

While the other input terminal of the comparator 115 is with an upper first threshold th1 generated in a threshold generator 116. The comparator 115 provides the upper edge detection signal to an edge counter 103, as shown in FIG. 3, when the difference is higher than the upper first threshold th1. While the comparator 115 provides a lower edge detection signal to the edge counter 103, when the difference is lower than a lower first threshold −th1.

Figure 2:
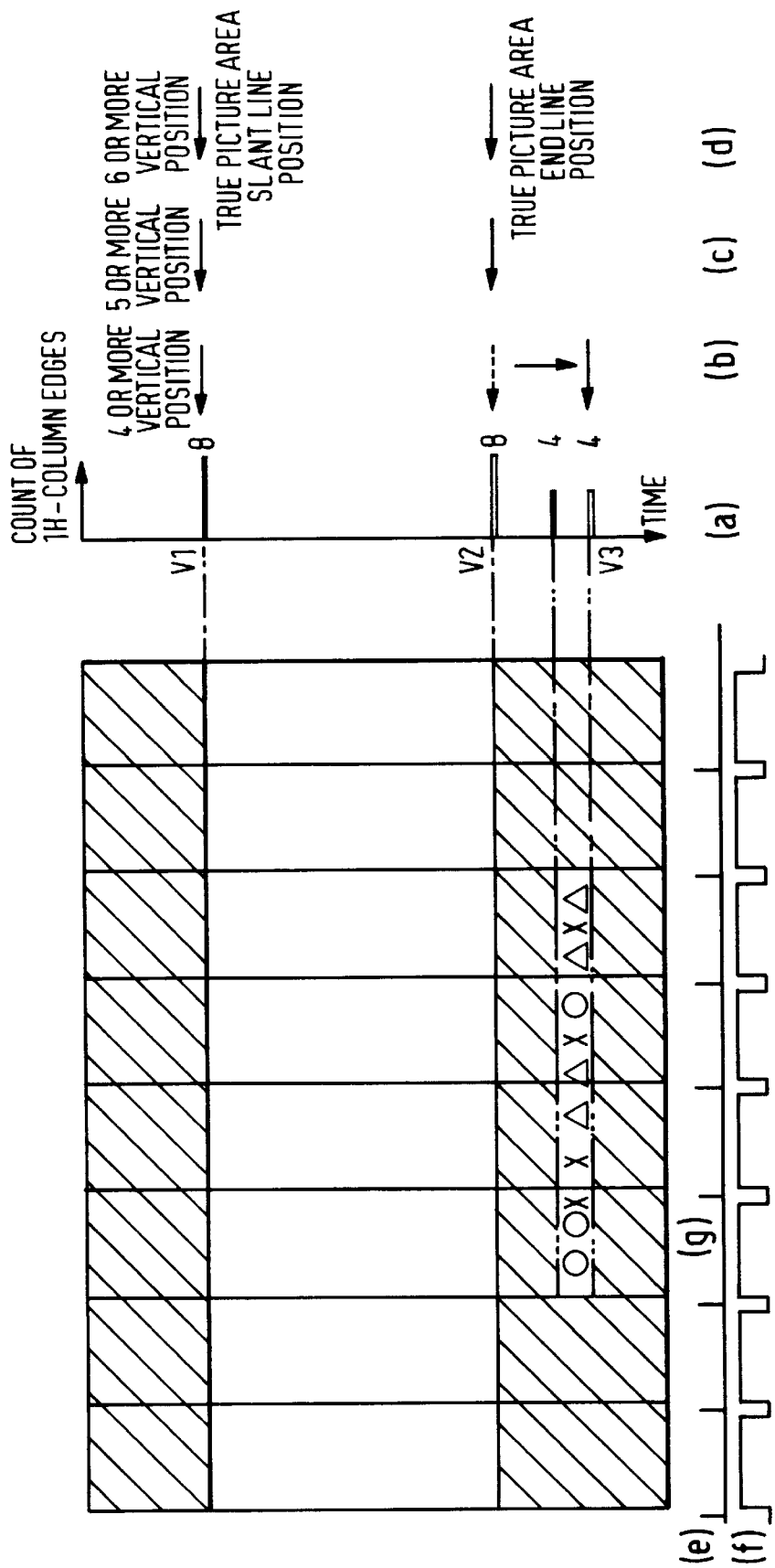
FIG. 2 is a diagram for explaining the operation of the letterbox image detection apparatus in FIG. 1.

The edge counter 103 counts the upper edges as detected (see thick solid lines in FIG. 2a) and the lower edges as detected (see thick hollow lines in FIG. 2a) for every screen image. In the case of FIG. 2, 8 counts of the upper edges as detected are generated on the top of the main image, while 4 counts of the upper edges as detected are generated at the top of the caption band. Similarly, 8 counts of the lower edges as detected are generated on the bottom of the main image, while 4 counts of the lower edges as detected are generated at the bottom of the caption band.

A line position data generator 105 generates data representing the position data of every line, i.e., every horizontal scanning line, in response to the horizontal sync signal and the vertical sync signal supplied thereinto. The line position data generator 105 supplies the line position data to three units of line position data holders 104 for holding every line data for three sets of the top and bottom lines of the main image. These line position data holders 104 are supplied with a valid edge detection signal, only when any one of following three combinations of line features, i.e., a first combination of a line with 4 or more counts of upper edges as detected and another line with 4 or more counts of lower edges as detected, a second combination of a line with 5 or more counts of upper edges as detected and another line with 5 or more counts of lower edges as detected, and a third combination of a line with 6 or more counts of upper edges as detected and another line with 6 or more counts of lower edges as detected.

Each of the line position data holders 104 holds a first occurrence of line position data in each field in regard to the upper edge. While the line position data holders 104 each holds a last occurrence of line position data in each field in regard to the lower edge.

Accordingly, in this case, the line position data hold in each or the line position data holders 104 at the end of a given field has the same value v1, as shown in FIG. 30a, in regard to the upper edge. In regard to the lower edge, a line with 4 or more lower edges as detected has a line position data of the value v3. Also a line with 5 or more lower edges as detected and another line with 6 or more lower edges as detected have the same line position data of the value v2 (see FIGS. 2b, 2c and 2d) . As to the set of line position data corresponding to the line with 4 or more upper edge detection signals and the other line with 4 or more lower edges as detected are held, the line position data holders 104 temporarily holds the value v2, as shown in FIG. 2b, in regard to the lower edge. However, the line position data is finally updated to the value v3, as shown by the arrow in FIG. 2b. Thus the last occurrence of line position data is held in the line position data holders.

The data held in the three sets of the line position data holder 104 are initialized to predetermined distinguishable from the valid line position data prior the start of every field. When a line with specified counts of edge detection signal are not found, the date in the line position data holders 104 are kept to a predetermined value.

These line position data held in the line position data holders 104 are supplied to a picture area end detector 106. The line position data which is valid and can hold the largest count of edges among the three sets of the upper edge holding lines is selected. That is, the valid and the biggest line position data is selected among the three sets of the upper edge holding lines. Then, the valid and lowest line position data is selected among three sets of the lower edge holding lines.

In the embodiment of FIG. 2, the value v1 is selected for the upper edge position data. While the value v2 is selected for the lower edge position data, not but the value v3. These selected line position data are showing the boundary of non picture and the main image, that is the top and bottom line position data of the picture area.

Accordingly, in the picture area end detector 106, when the selected top and lower edge line position data holding values are both valid the field is determined to have a letterbox image.

According to the operation described above, true top and bottom picture area end data are obtained without mistaking the bottom line of the caption band as the bottom picture edge. In this embodiment, three sets of edge count thresholds, i.e., 4 or more edges, 5 or more edges and 6 or more edges are selected as the count of edges. However, other count of edges may be selected, Further, while the same edge count thresholds are selected for determining the upper and bottom edges of picture area, to both top and bottoms, the edge count thresholds may be different from each other. And, in this embodiment it is explained by the embodiment of 8 columns splitting, however, the count of columns may be changed.

In this embodiment, the input image is explained in the case that it has edges over 8 columns at the top and bottom picture area end data as shown in FIG. 2g. However, in general case that the count of the in-column edges on the true picture area top and bottom lines are more than that on the caption band in the screen image, the true top and bottom picture area end data are obtained by properly setting the edge count thresholds and the number of their units.

And, in this embodiment, the average luminance is used as the image property of the inter column image, however, other values such as a median may be us as the image property.

Figure 4:
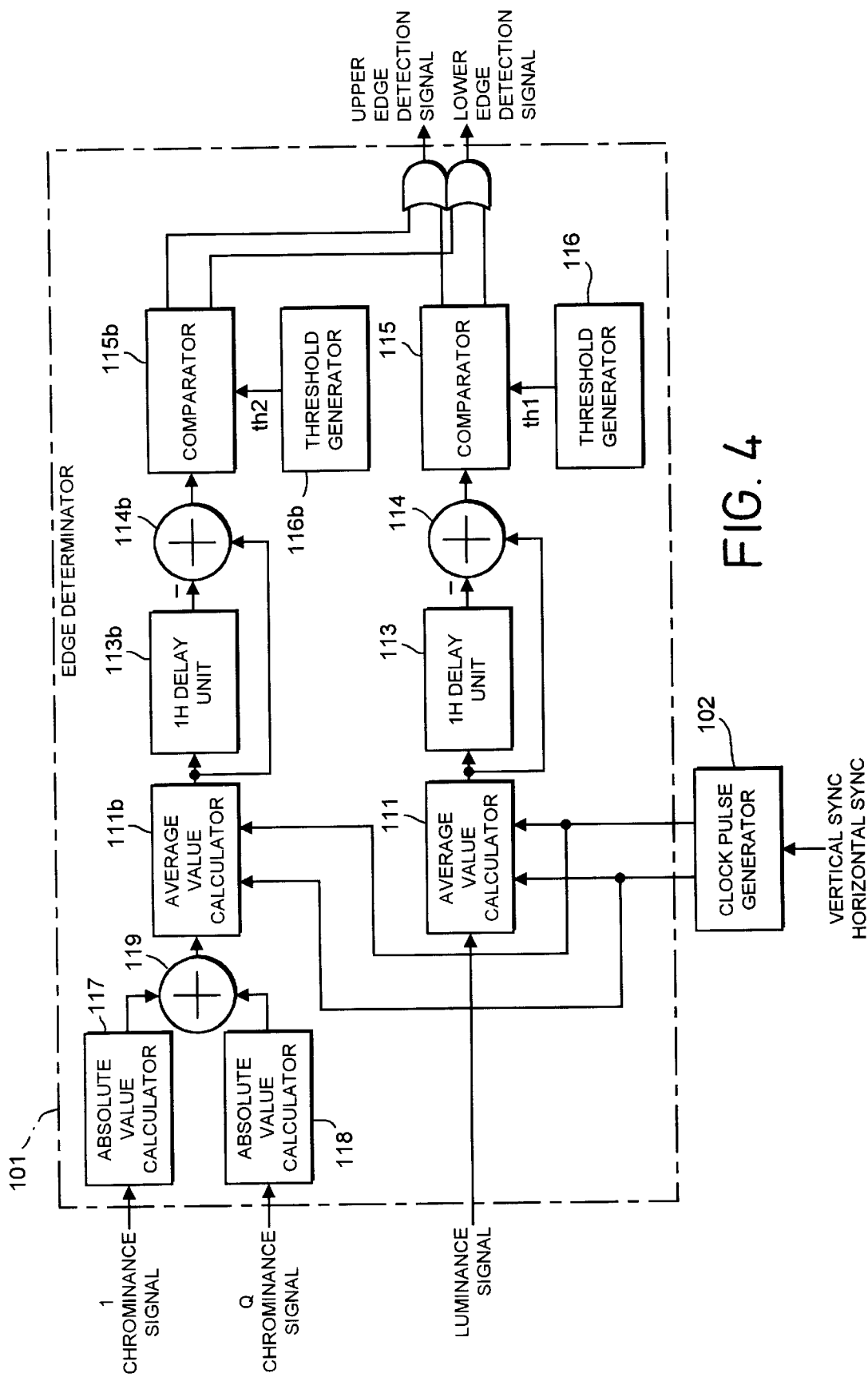
FIG. 4 is a block diagram showing the other construction of the edge determinator 101 in FIG. 1.

Further, the edge determinator 101 may be constructed as shown in FIG. 4. In FIG. 4, the I luminance signal and Q luminance signal of the screen image as inputs change to the absolute values in an absolute value calculators 117 and 118. These absolute value outputs are both added in an adder 119, and its average in the column is taken in an average value calculator 111b in the same way as the luminance signal processing shown in FIG. 3. Then the inter-line difference is taken in a 1H delay unit 113b and a subtractor 114b, and the inter-line difference is compared with a second threshold th2 generated in a threshold generator 116b. When the inter-line difference is higher than the second upper threshold th2 (>th2), it is determined that there is an in-column upper edge based on the luminance signal. When the inter-line difference is lower than the second lower threshold th2 (<−th2), it is determined that there is an in-column lower edge based on the luminance signal.

The determination result is operated an OR logic with the luminance signal processing based in-column edge detection signal, as shown in FIG. 3, for outputting an in-column edge determination signal from the edge determinator 101.

Figure 5:
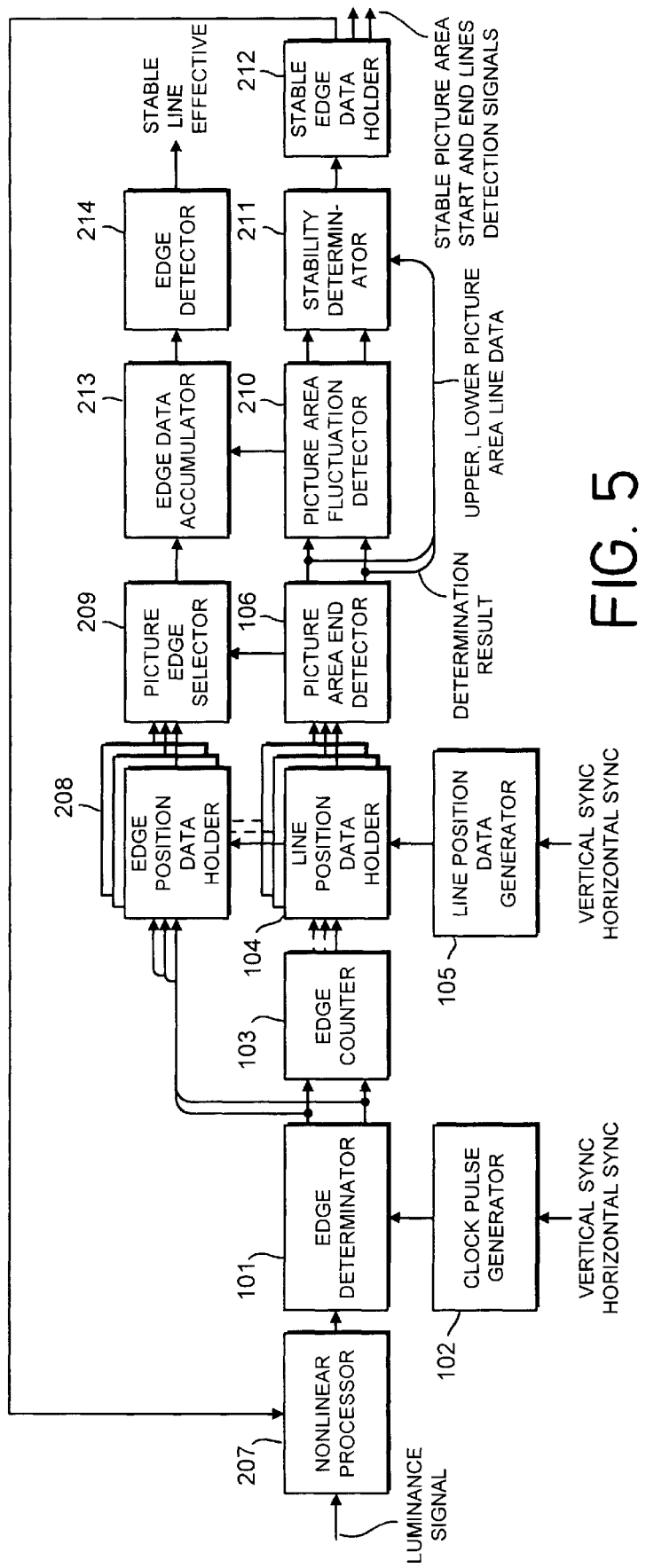
FIG. 5 is a block diagram showing a second embodiment or the letterbox image detection apparatus according to the present invention.
Figures 8A, 8B:
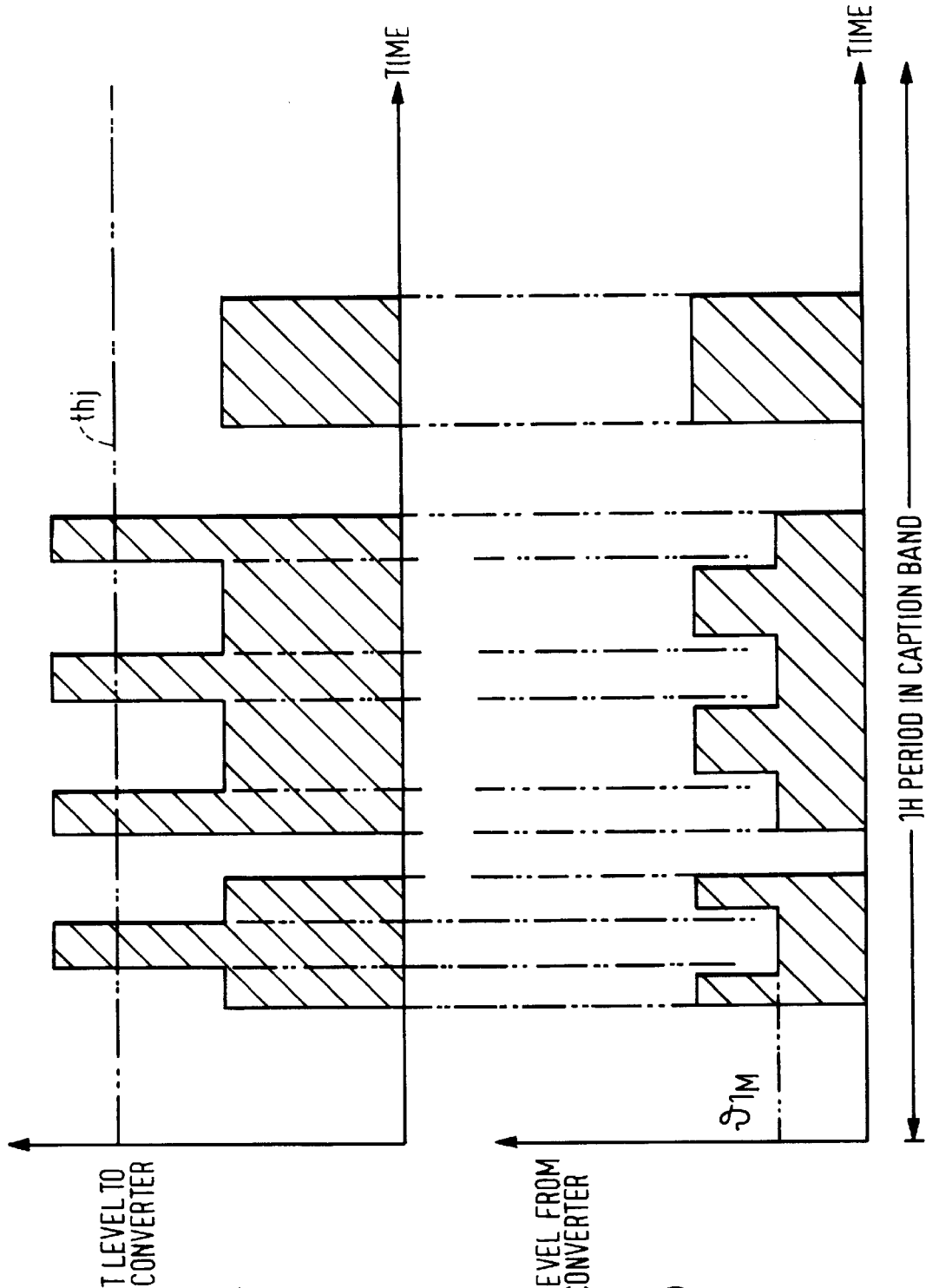
FIG. 8 is a diagram for explaining the operation of the nonlinear processor 207 (level converter) in FIG. 5.

A second embodiment of the letterbox image detection apparatus according to the present invention will be described in reference to FIGS. 5 through 8. In FIG. 5, the same components as those shown in FIG. 1 are assigned with the same marks, and the detail explanation will be omitted.

The luminance signal of the screen image is applied to one input terminal of a nonlinear processor 207. The nonlinear processor 207 is an amplitude limiter which outputs the luminance signal without limiting when a logic level "1" is applied, while limiting the luminance signal lower than a third threshold th3 when a control data "0" is applied.

The edge determinator 101, the clock pulse generator 102, the edge counter 103, the line position data holders 104, the line position data generator 105, and the picture area end detector 106 operate in the same way as those of the first embodiment in response to the output from the nonlinear processor 207. As explained in the first embodiment, the picture area end detector 106 outputs the letterbox image determination result of the top and bottom picture edge and field unit.

Three units of edge position data holders 208 correspond in a one-to-one relationship with the three units of the line position data holders 104 for adapting with the edge count thresholds, i.e., the 4 or more edge counts, the 5 or more edge counts and the 6 or more edge counts, respectively. Every when each of the line position data holders 104 is updated by the line position data, each of the edge position data holders 208 is updated by the in-column edge's horizontal position data across one horizontal period.

To be more concrete, about the upper edge, all of more than 4, more than 5, and more than 6 hold the horizontal position data of the edge of v1 line. On the other hand, about the lower edge, at first more than 4, more than 5, and more than 6 hold the horizontal position data of the edge of v2 line. However, since only four count of the in-column edges are detected at the v3 line, it updates the horizontal position data held in the edge holders 208 associated with the line position data holders 104 of the lower edge more than 4 from (11111111) to (00111100).

The picture edge selector 209 outputs the edge position data corresponding to the count of edges determined in the picture area end detector 106 by the edge position data held in the edge position data holder 208 as its input.

A picture edge fluctuation detector 210, having the top and bottom picture edge that is the output from the picture area end detector 106 and the determination result as its input, clears the edge horizontal position data accumulated in an edge data accumulator 213 when the inter-line differences of the top and bottom image picture lines of field and the top and bottom picture edge of one field before are higher than the fourth threshold th4, but it does not clear the edge horizontal position data when these inter-line differences are lower than the fourth threshold th4.

Further, the picture edge fluctuation detector 210 outputs a "0" logic level representing that the fluctuation of the picture edge is great when the inter-line differences of the top and bottom picture area end data of the field and the top and bottom lines of one field before are higher than the fifth threshold th5, and it outputs a "1" logic level representing that the fluctuation is small when the inter-line differences are lower the fifth threshold th5.

A stability determinator 211 detects that it is stable when the input of the top and bottom picture area and data fluctuation detection result is always kept in the value "1" for a specific field so as to supply the value "1" to a stable edge data holder 212.

It detects that the edge is unstable when the fluctuation detection result of either the top or the bottom picture edge is in the value "0" in any field so as to supply the value "0" to the stable edge data holder 212.

The stable edge data holder 212 obtains the current top and bottom picture area end data from the picture area end detector 106 when the stability detection result has the "1" logic level and updates the top and bottom stable picture area end data. In the other way, it holds the top and bottom stable picture area end data without updating them when the stability detection result has a "0" logic level.

On one hand that the updated top and bottom stable picture area and data are output, a picture area indicating signal having the "1" level across the picture area and top and bottom α-length areas is supplied to the control terminal of the nonlinear processor 207 (see FIG. 7b).

According to this operation, the image signal is suppressed its amplitude for portions outside the top and bottom stable picture end lines (see FIG. 7c). Accordingly, once the stable top and bottom picture area ends are set up, it controls the amplitude limit to the extent not to generate any in-column edge determination signal at the vertical position data even if the horizontally extending caption band having high luminance appears. So that the top and bottom picture area ends will be stably detected.

Here, the amplitude limiter is used as the nonlinear processor 207. However, the same effect may be obtained by using a level converter for converting levels of a pixel having a level higher than a predetermined threshold thj and its laterally neighboring pixels having levels higher than a predetermined level lim to the level lim.

Here, the picture edge fluctuation detector 210, the stability determinator 211, and the sable line holder 212 may be operated by the flame unit.

The edge data accumulator 213 accumulates logical ORs of position data of edge representing lines in every field until it being cleared by a clear signal applied from the picture area end fluctuation detector 210. The edge data accumulator 213 then provides the edge representing line position data to an edge detector 214 for period of the picture area end being stabilized (the accumulation of edge present).

The edge detector 214, which counts horizontal position data of the edge, outputs the "1" logic level representing that top and bottom stable lines are valid when it is higher than a sixth threshold th6, but outputs "0" logic level representing that the stable picture area end data are invalid when it is lower the sixth threshold th6.

Figure 32:
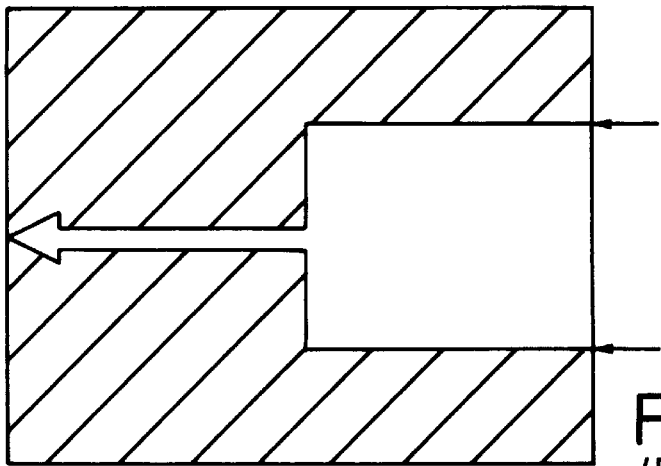
FIG. 32 is a diagram showing the screen image that the letterbox image detection apparatus in FIG. 29 incorrectly detects if it is the letterbox image system or not.
Figure 34:
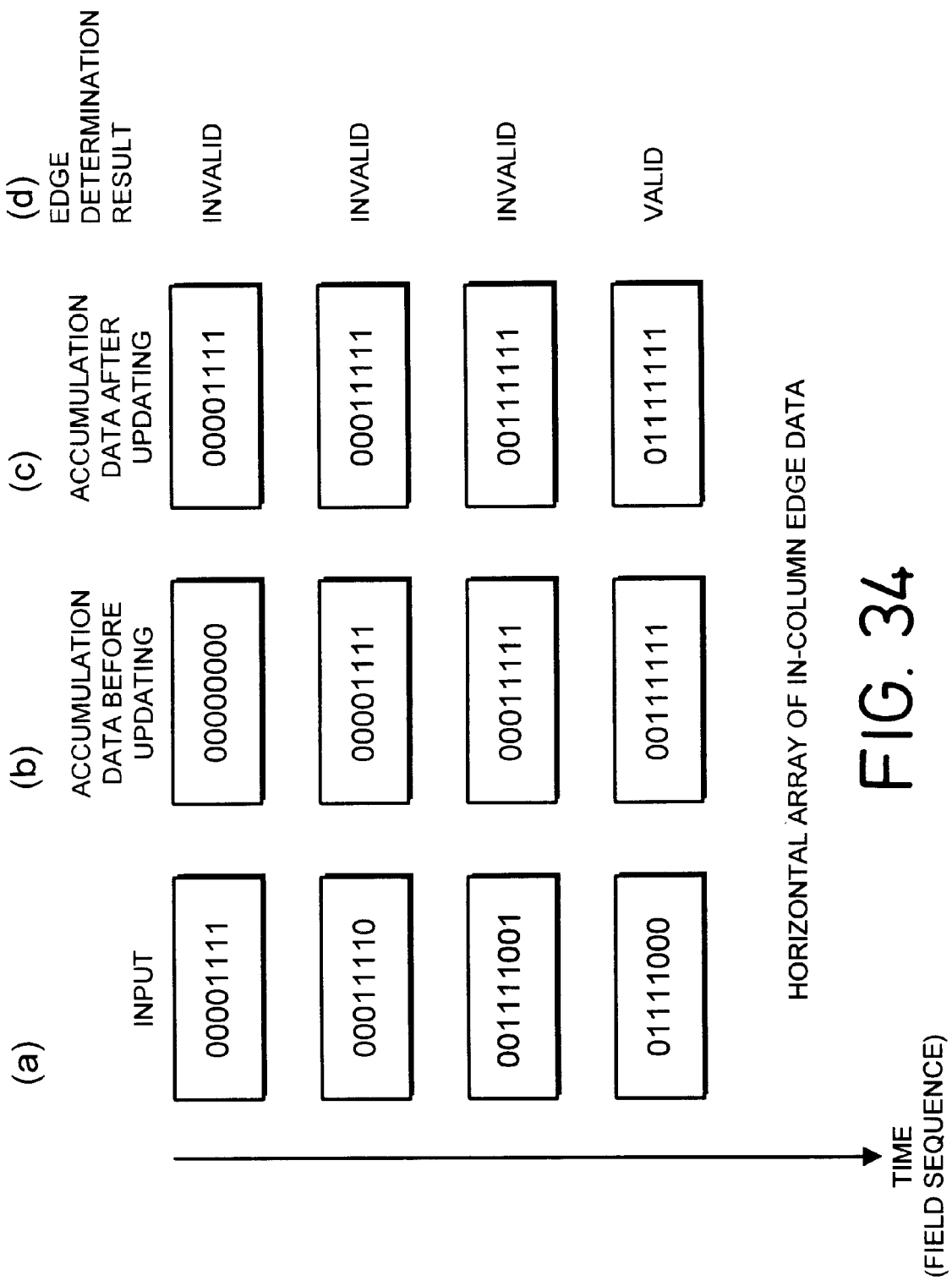
FIG. 34 is a diagram for explaining the operation of the edge data accumulator 213 and the edge detector 214 in FIG. 5.

The operations of the edge data accumulator 213 and the edge detector 214 will be explained in case that the bright part moves from right to left on the screen as shown in FIG. 32. As shown in FIG. 34, if the output from the picture edge selector 209 is taken as shown in FIG. 34a, the logic level "1" representing the in-column edge moves from left to right with the passage of time. Accordingly, the storing value after updating will be changed as c, and edge detector 214 outputs as valid when the count of accumulate "1" logic levels exceeds the sixth threshold th6 (=6).

Accordingly, even when for instance the count of in-column edges by field unit are relatively small like 4, and the edge detector can not determine as the edge only by the edge count in its field, it can determine that there are plenty of edges when the accumulation is higher than the sixth threshold th6.

In the above explanations, the edge position data holders 208 are associated in a one-to-one relationship with the line position data holders 104. However, the edge position data holders 200 may be arranged to hold not only the in-column edge's horizontal position data for the line with the subjective count of the in-column edges but also the in-column edge's horizontal position data for other vertical neighboring lines. While the picture edge selector 209 may be arranged to output both of the column presence horizontal position data may be output both of the in-column edge's horizontal position data for the line with the subjective count of the in-column edges and the in-column edge's horizontal position data for other vertical neighboring lines. Also the edge data accumulator 213 maybe arranged to calculate an OR logic of those in-column edge's a horizontal position data. In this construction, the case that the boundary of the central main image and the non image is not parallel to the scanning line is able to be detected as the letterbox image system.

As explained above, even the screen image that is not able to be determined as the letterbox image system by only the single field (for instance FIG. 32), or the screen image which boundary of the central main image and the non image slightly incline in unparallel to the scanning line (for instance FIG. 33) can be determined as the letterbox image system if the edge is detected by the count of the accumulated edges.

The present invention is explained in the logic circuit like by using above two embodiments. As a matter of course, it is possible to be constructed by the program software such as the microcomputer or DSP (Digital Signal Processor).

Figure 9:
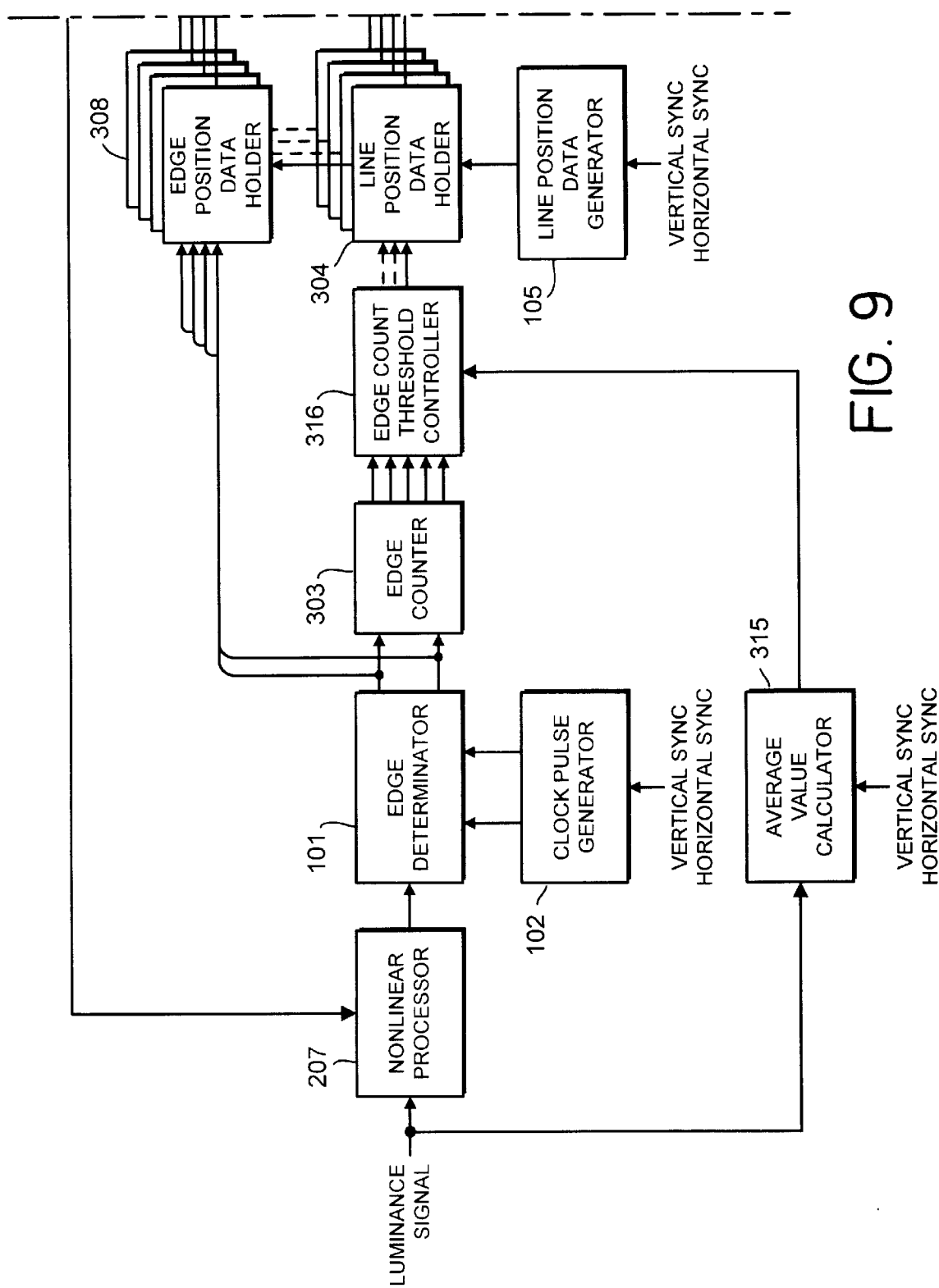
FIG. 9 is a block diagram showing a third embodiment of the letterbox image detection apparatus according to the present invention.
Figure 9:
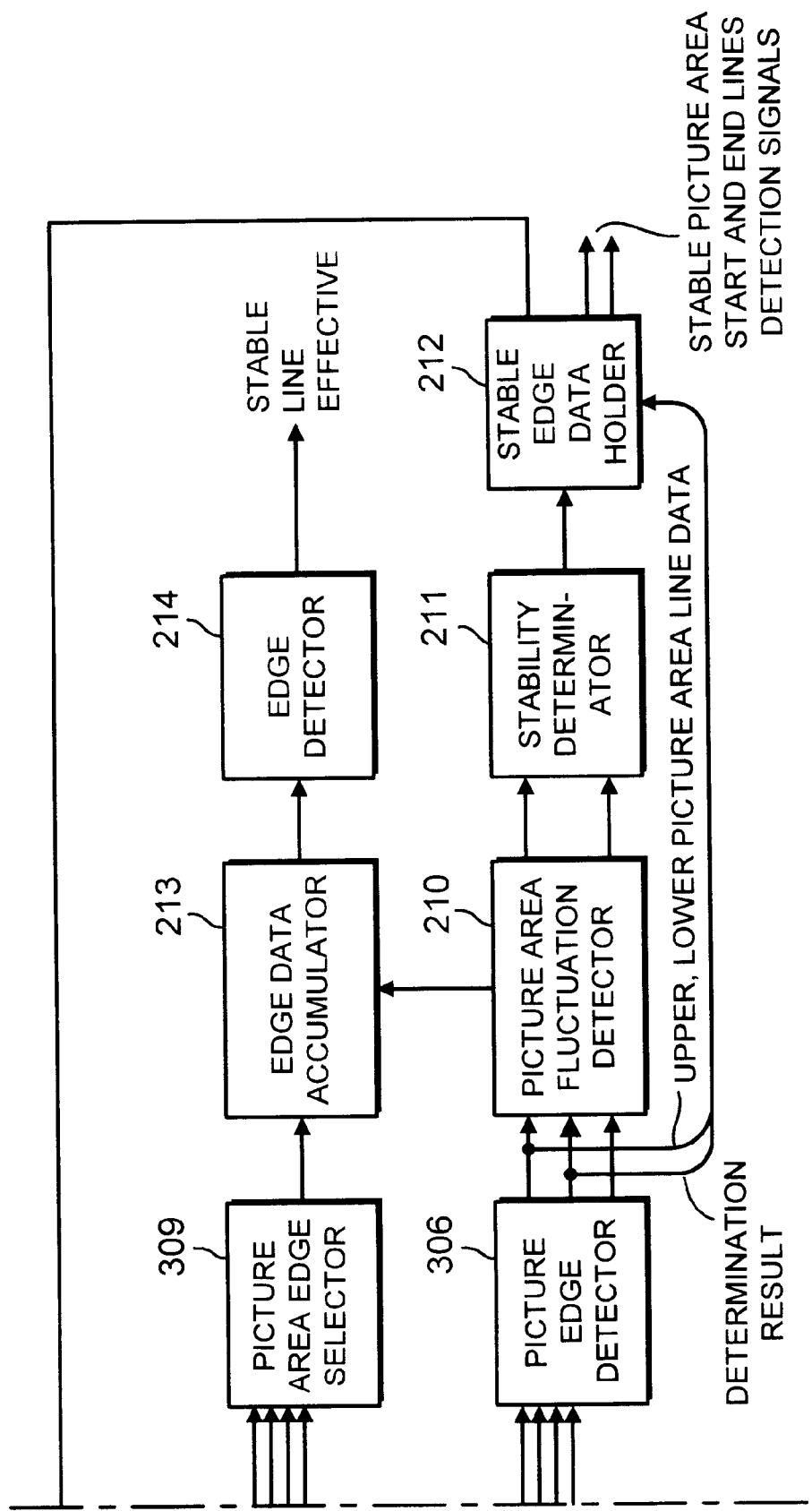
Figure 10:
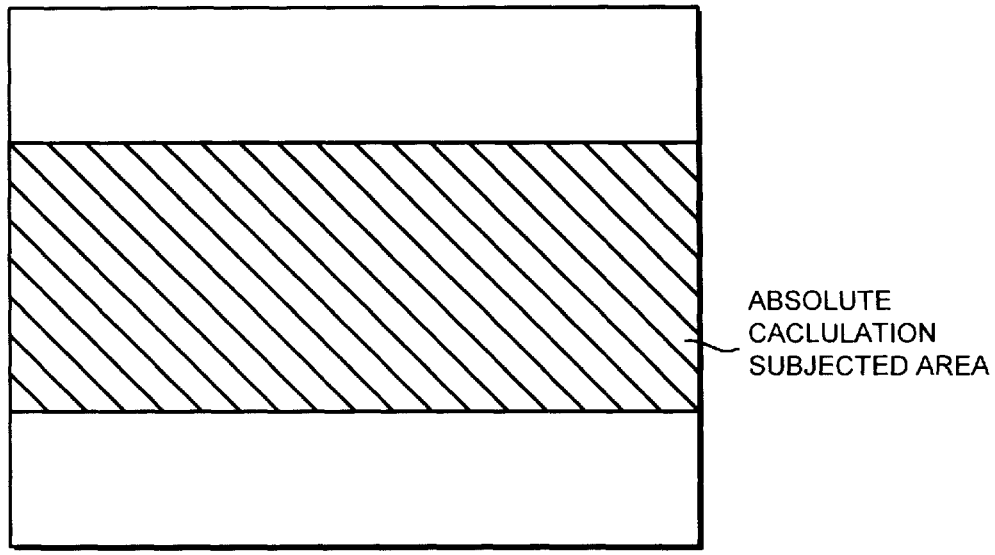
FIG. 10 is a view showing the other area subjected to the average value calculator 315 shown in FIG. 9 and the average value calculator 407 shown in FIG. 14 as the diagonally shaded area on the screen.

A third embodiment of the letterbox image detection apparatus according to the present invention will be described in reference to FIGS. 9 through 13. In FIG. 9, the same comments as those shown in the first and the second embodiments shown in FIGS. 1 and 5 are assigned with the same marks and detail explanation will be omitted.

The luminance signal component of the image signal is applied to the nonlinear processor 207. The output from the nonlinear processor 207 is applied to the edge determinator 101.

The clock pulse generator 102 taking the vertical sync signal and the horizontal sync signal as its input generates the clear pulse mentioned above (see FIG. 2g) and the average value calculation range pulse (see FIG. 2f) and supplies them to the other input terminal of the edge determinator 101.

The edge determinator 101 takes the inter-line difference of each column which is split the valid image interval of the one-horizontal period into 6, so as to determine the presence of the top and lower edge of each column.

This top and lower edge determination results are applied to the edge counter 303 and the edge position data holder 308.

The edge counter 303 counts the in-column edges across one horizontal period, and then supplies "1" logic levels to the edge count threshold controller 316 when there are three or more in-column edges, four or more in-column edges, five or more in-column edges, six or more in-column edges, or seven or more in-column edges, respectively.

Figure 30:
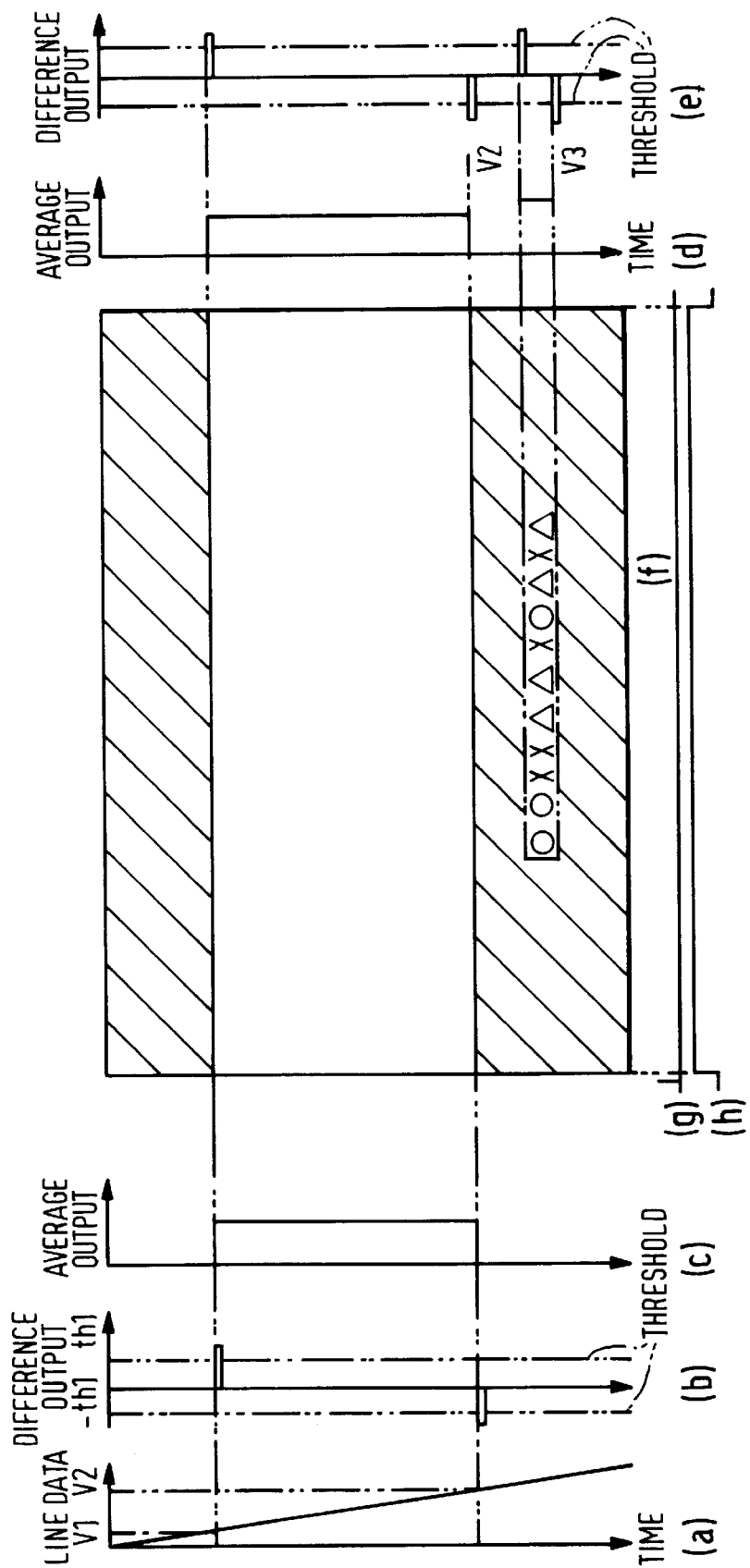
FIG. 30 is a diagram for explaining the operation of the letterbox image detection apparatus in FIG. 29.

On the other hand, the luminance component of the image signal is also applied to the average value calculator 315. The average value calculator 315 calculates the average luminance level or the central main image of the 4:3 aspect screen which is corresponding to the central main image of the letterbox screen as shown in FIG. 30, so as to update the value to the vertical (hereinafter referred to as V) blanking period and supplies the value to the edge count threshold controller 316.

Figure 11:
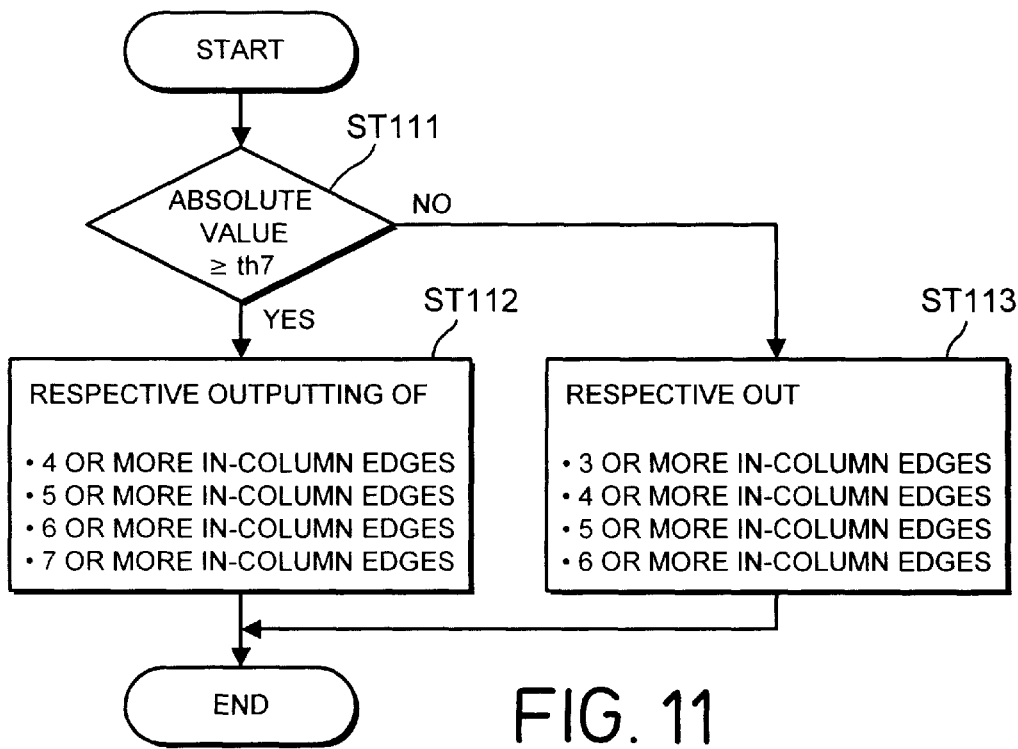
FIG. 11 is a flow chart for explaining the operation of the edge controller 316 shown in FIG. 9.

The edge count threshold controller 316 changes the edge count threshold according to the output from the average value calculator 315. FIG. 11 is a flowchart for explaining the operation of the edge count threshold controller 316.

The edge count threshold controller 316 is applied with five kinds of edge count results such as more than 3, more than 4, more than 5, more than 6, and more than 7.

When the output from the average value calculator 315 is more than the threshold th7 (in case of YES of ST111) the central main screen image is determined to blight, four kinds of larger edge counts, i.e., counts more then 4, more than 5, more than 6, and more than 7 among the five kinds of the resultant edge count are selectively output.

When the output from the average value calculator 315 is lower than the threshold th7 the central main screen image is determined to the dark (in case of the NO branch from ST111), four kinds of smaller edge count, i.e., counts of more than 3, more than 4, more than 5, and more than 6 among the five kinds of the resultant count are selectively output.

Figure 12:
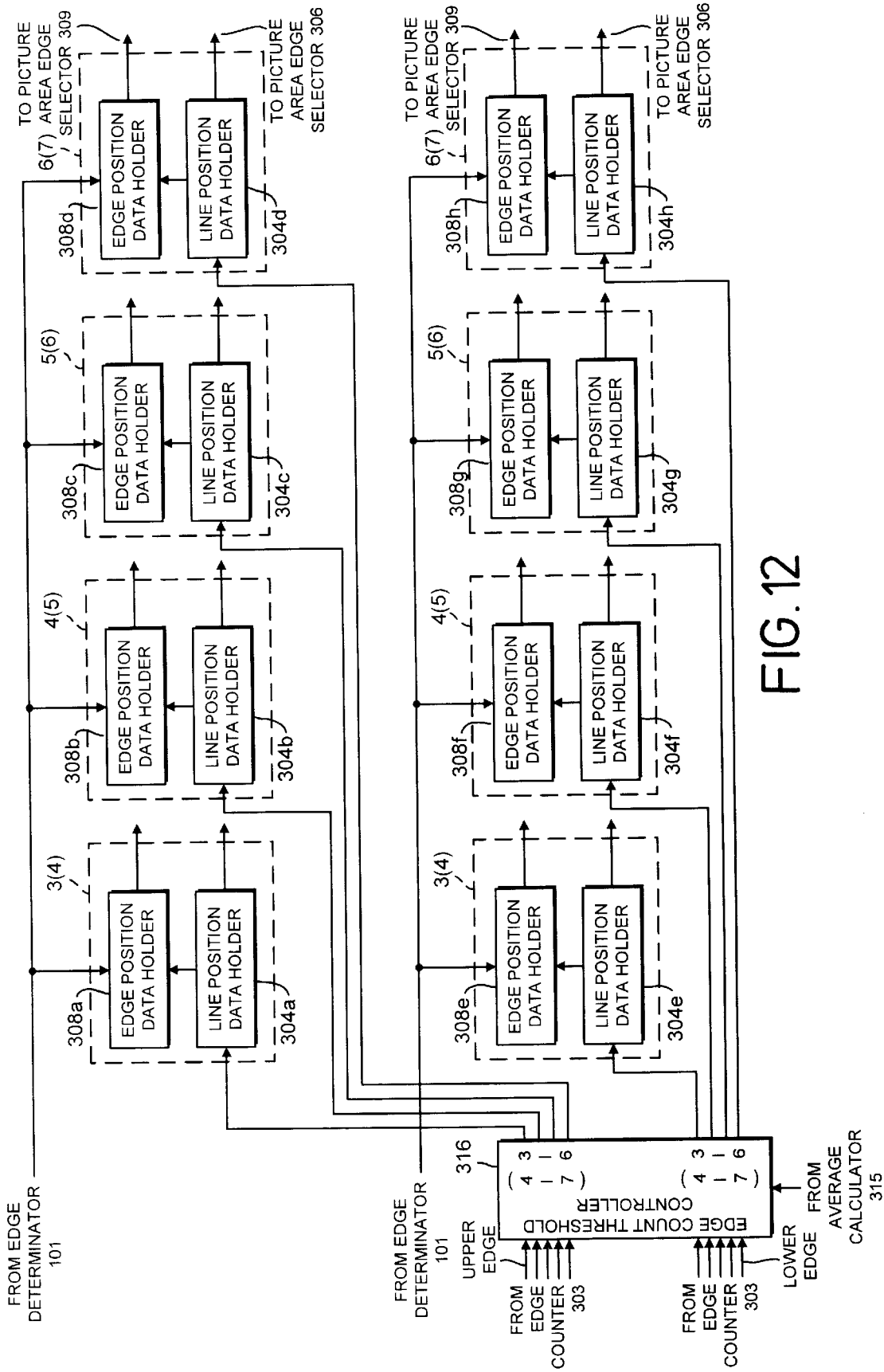
FIG. 12 is a block diagram for explaining the operations of the edge count threshold controller 316, the line position data holder 304, and the edge position data holder 308, shown in FIG. 9.

As shown in FIG. 12, the line position data holder 304 and the edge position data holder 308 correspond with each other in a one-to-one relationship according to the count of the in-column edges.

The line position data holders 304a through 304d and the edge position data holders 308a through 308d newly hold the line position data and the horizontal position data of the edge-occurring column when the upper edge-occurring horizontal has initially come in every field. According to this operation, it can hold position data of the highest line where each count of in-column edged is occurred and the horizontal position data corresponding to the count of in-column edges at that time.

Further, if the edge corresponding to the edge count is not generated over the one field interval the invalid line position data which is initialized at the V blanking ending time is remain in the line position data holder 304.

The line position data holders 304e through 304h and the edge position data holders 308e through 308h newly hold the line position data and the horizontal position data corresponding to the count of in-column edges in every time when it comes to the horizontal line whereon prescribed count of in-column edges are detected for every fields. According to this operation, it can hold position data of the lowest line where each count of in-column edges is occurred and the horizontal position data corresponding to the count of in-column edges at that time.

Further, if the edge of the picture area with corresponding count of in-column edges is not generated across every one field, a predetermined line position data which has been initialized at the end of a vertical blanking period remains in the line position data holder 304.

The picture edge detector 306 determines the biggest line position data about the upper edge and the smallest line position data about the lower edge among each top and bottom four kinds of line position data output from the line position data holder 304.

And, the picture edge detector 306 supplies a signal associated with the line position data which resulted in the determine output to the picture edge selector 309.

The picture edge selector 309 provided with the output from the picture edge detector 306 selects the edge horizontal position data corresponding to the edge position data holder 308 and supplies the data to the edge data accumulator 213.

The following operations will be same as that explained for the second embodiment.

The operation mentioned above will be further explained. When the central main screen image is high luminance, the edge count in interest will be increased to such as 4 edges through 7 edges. When the central main screen image is high luminance a great number of edge will be expected.

Since it does not sense toward to the caption band or picture area containing smaller edge counts than expected such as less than three in one-horizontal period, so as to reduce the wrong operation, On the other hand, when the central main screen image is low luminance the upper first threshold th1 for the edge detection does not reduced, but the edge count will be reduced to 3 through 6.

So when the central main screen image is low luminance, a great number of edge is not expected, however, since the upper first threshold th1 for the edge detection remains as it is the edges are certainly generated.

Accordingly, if the edges occupy the most part of the horizontal period as the accumulated count of in-column edges even if the edges are relatively small in number, edges will be determined to be existed, an efficiency will be maintained toward the low luminance. In this embodiment, the sets of the edge number in interest are 4 through 7, and 3 through 6, however, the sets are not limited to these sets mentioned above, but these may be other sets.

Figure 13:
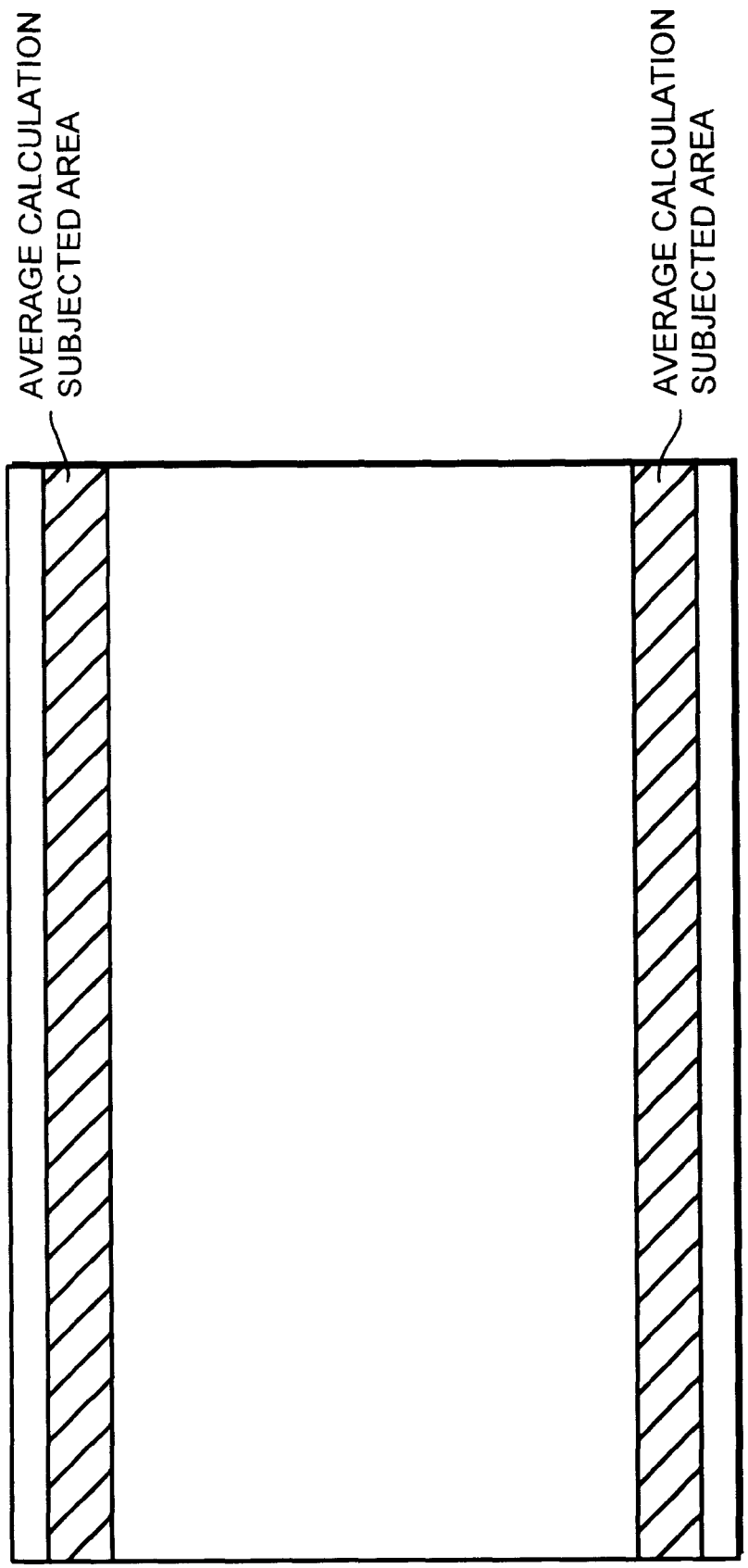
FIG. 13 is a view showing the other area subjected to the average value calculator 315 shown in FIG. 9 and the average value calculator 407 shown in FIG. 14 as the diagonally shaded areas on the screen.

Further, the central main screen image is selected as the area subjected to the average value calculator 315, however, the several lines around the screen top and bottom which is always non screen area at the letterbox image input time may be the average value calculation subjected area (see FIG. 13).

When the output from the average value calculator 315 is a big value, since the level of the non image is determined to be raised it can reduce the wrong operation by the great count of the in-column edge. On the other hand, when the output is a low value it can maintain the efficiency by the making the count of in-column edges a little bit smaller.

If the level is ranged uniformly when the average level of the central main image is high the count of in-column edges of the true edge line will be expected to be a great in number. At this time, the threshold of the count of in-column edges which is needed for determining to be the edge line is made to be high value. So that the caption band separation ability will be high as shown in the embodiment mentioned above.

Figure 14:
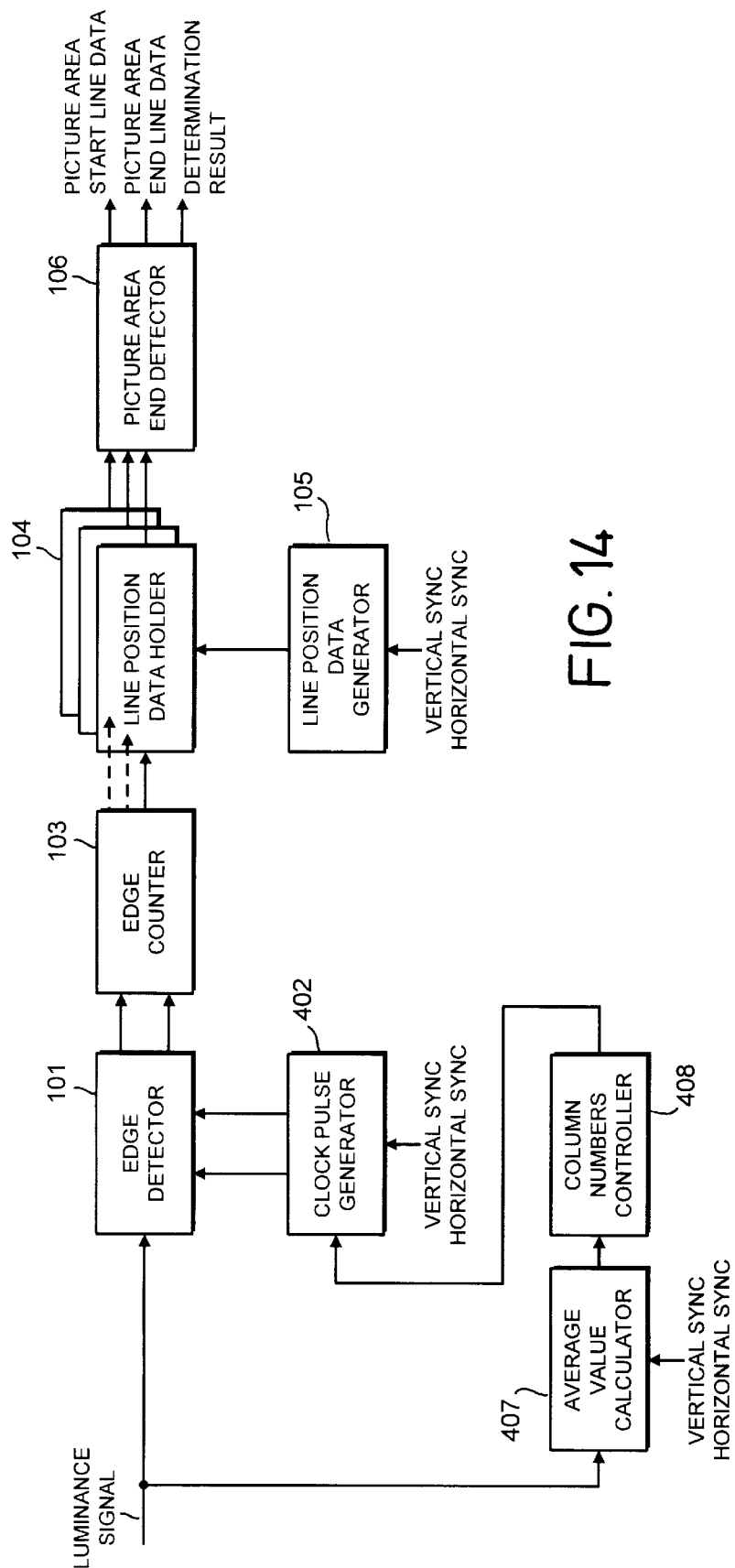
FIG. 14 is a block diagram showing a fourth embodiment of the letterbox image detection apparatus according to the present invention.

A fourth embodiment of the letterbox image detection apparatus according to the present invention will be described in reference to FIG. 14. In FIG. 14, the same components as those shown in the first embodiment shown in FIG. 1 are assigned with the same marks.

The luminance component of the image signal is applied to the average value calculator 407 and the edge determinator 101. The average value calculator 407 calculates the average of the luminance component input as objecting around the central main screen image shown in FIG. 10, holds the average for a vertical blanking interval, and outputs the value in a following field interval.

The output from the average value calculator 407 is applied to the column numbers controller 408. The column numbers controller 408 determines that the luminance is enough when the input average is more than the threshold th8, so as to output a "1" logic level to the clock pulse generator 402.

In response to the "1" logic level, the clock pulse generator 402 generates a clock pulse for splitting the screen image into 8 columns.

On the other hand, the column numbers controller 408 determines that the luminance is not enough when the input average is less than the threshold th8, and generates a "0" logic level to the clock pulse generator 402.

In response to the output "0", the clock pulse generator 402 generates a clock pulse for splitting the screen image into a smaller number of columns, e.g., four columns which is smaller than those for a screen with an enough luminance.

According to the operations mentioned above, the column numbers in case of the low luminance near the central main screen image is made to be smaller than the column numbers in case of the high luminance, so that the numbers of pixel in every column at the low luminance level are increased and also an S/N (signal/noise) ratio will be improved.

Here, it is mentioned about the horizontal luminance level around the central main screen image. However, it may be the noise level related to the one through several lines which will be the non image part of the screen top and bottom part letterbox image input time, so as to be the column numbers controller 408 for controlling to reduce the column numbers when the noise level is high by changing the horizontal value calculator 407 to the noise level calculator.

Figure 15:
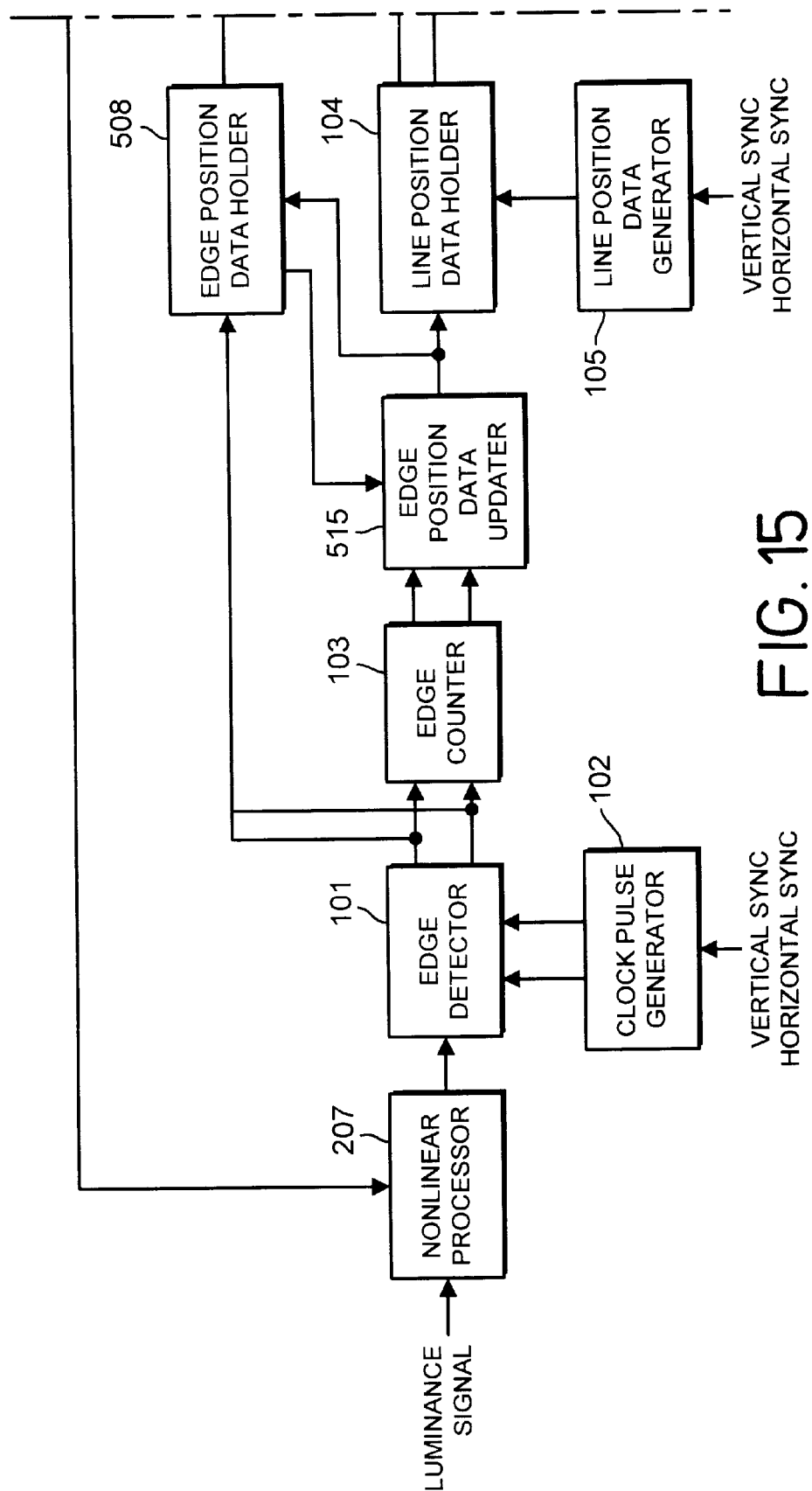
FIG. 15 is a block diagram showing a fifth embodiment of the letterbox image detection apparatus according to the present invention.
Figure 15:
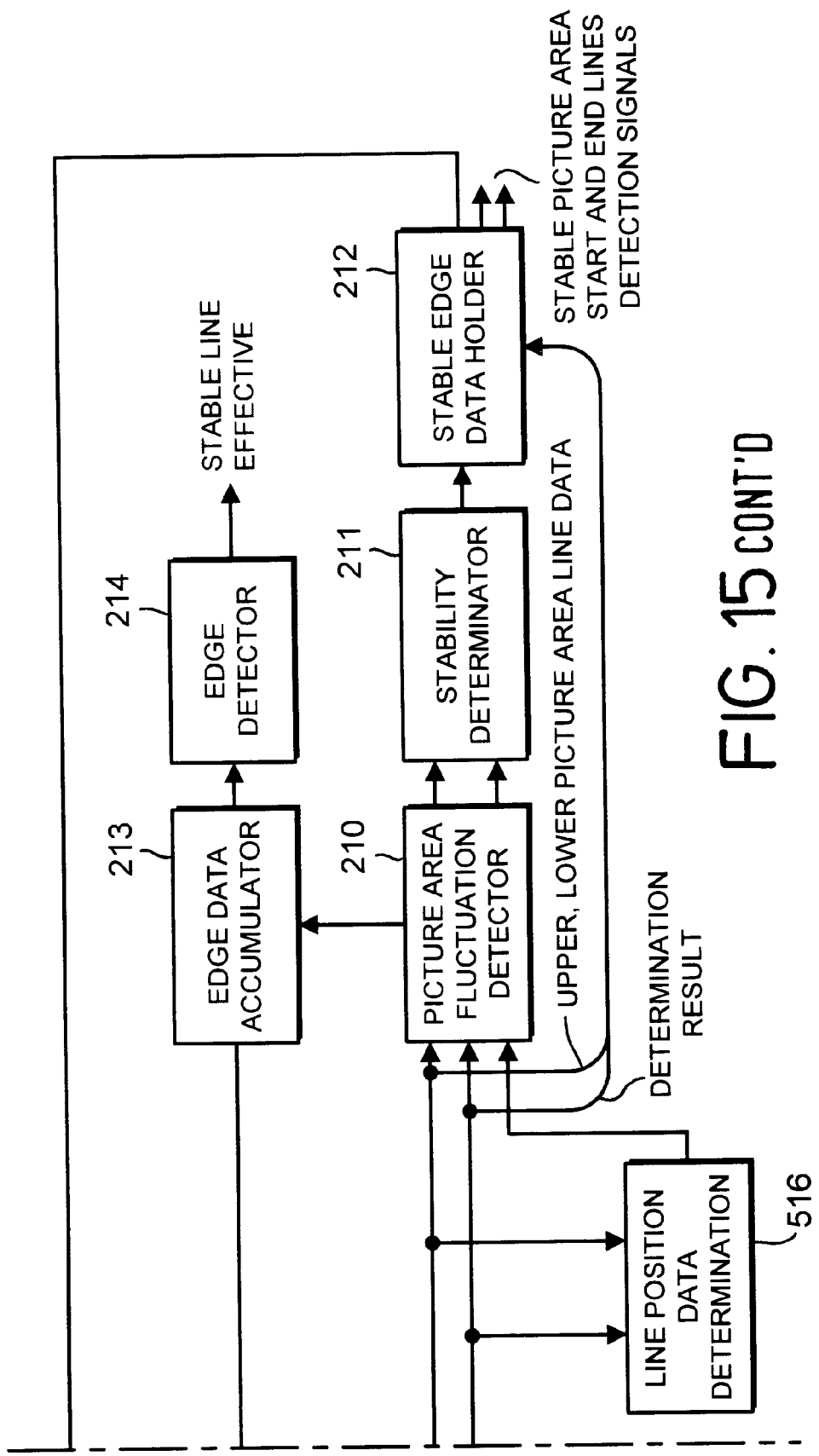
Figure 16A:
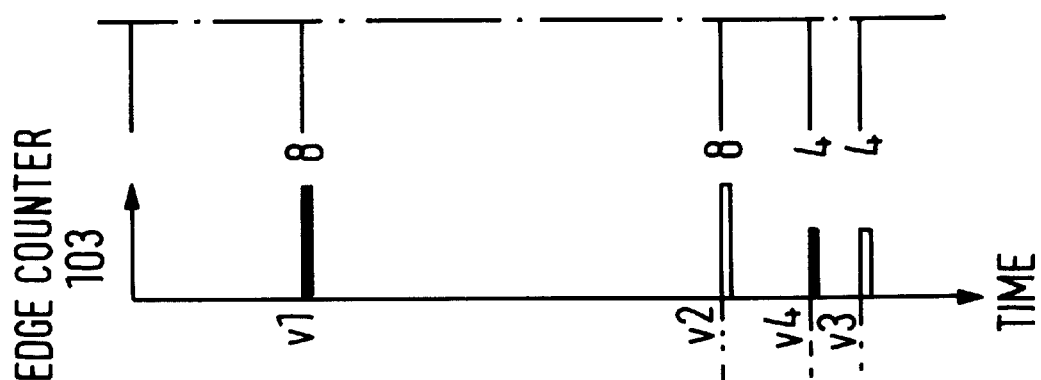
FIG. 16 is a view for explaining the operation of the fifth embodiment of the letterbox image detection apparatus according to the present invention.
Figure 16B:
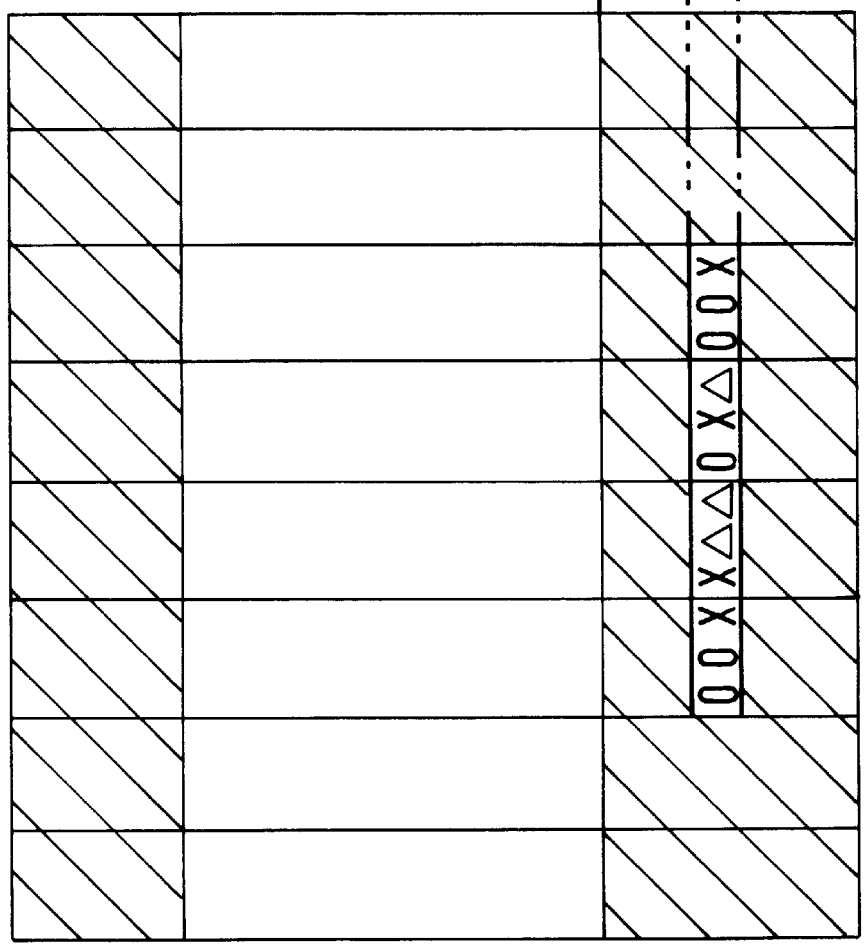
Figure 16C:
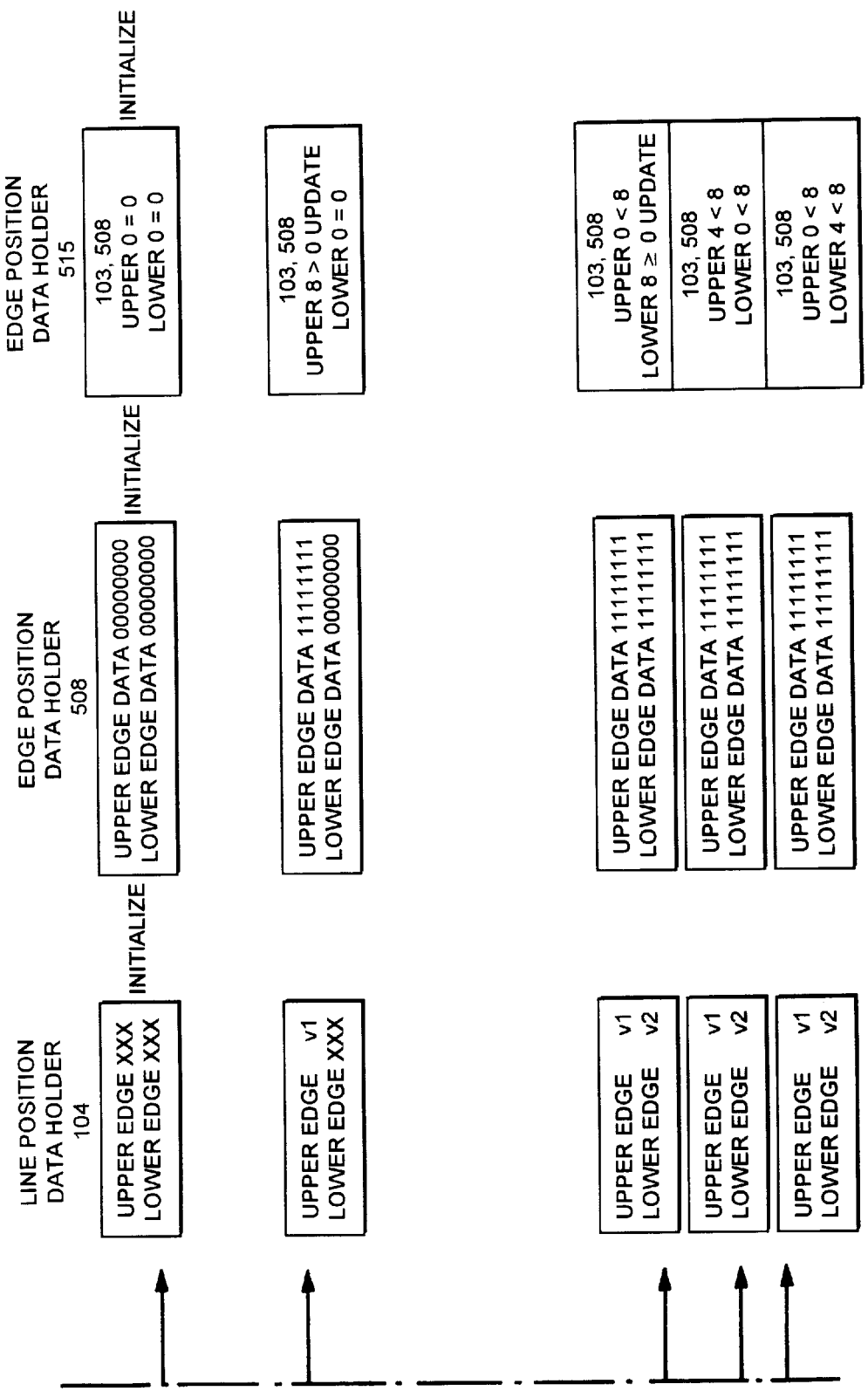

A fifth embodiment of the letterbox image detection apparatus according to the present invention will be described in reference to FIGS. 15 and 16. In FIG. 15, the same components as those shown in the first and second embodiments shown in FIGS. 1 and 5 are assigned with the same marks, and the detail explanation will be omitted.

The luminance signal of the screen image is applied to the one input terminal of the nonlinear processor 207. The edge determinator 101, the clock pulse generator 102, the edge counter 103, the line position data holders 104, and the line position data generator 105 are operated in the same manner as the first embodiment in response to the output from the nonlinear processor 207.

If both of the top and bottom picture area end data held in the line position data holder 104 applied to the line position data determinator 516 are valid, the line position data determinator 516 determines the input screen image as a letterbox image.

A single unit edge position data holder 508 associated in a one-to-one relationship with the single unit line position data holder 104 is updated by the in-column edge's horizontal position data across one-horizontal period from the edge determinator 101. In more concrete, the edge position data holder 508 receives an update instruction signal from an edge position data updater 515 as described later.

The operations of the edge position data holder 508, the edge position data updater 515, and the line position data holder 104 will be explained.

It is assumed that the count of the in-column edges of the edge position data updater 515 are 4 through 7. It is also assumed that a 4:3 aspect screen image, as shown in FIG. 16 (the same as the image shown in FIG. 2) has been applied thereto. At near the every vertical blanking end, that is the time before the screen top end shown in FIG. 16b, the line position data holder 104 is initialized to the invalid line position data and the edge position data holder 508 is initialized to the "0" logic level.

About the output from the edge counter 103 (see FIG. 16a), when the vertical position data comes to v1, the count of the upper in-column edges reaches a count of 8 for the first time.

At that time, the eight count of the in-column edges are counted in the edge counter 103 in regard to the upper edge, while a zero count of the in-column edges are held in the edge position data holder 508 in regard to the lower edge. When these counts are compared, the count in the edge counter 103 is higher than the count in the edge position data holder 508.

Accordingly, since it meets the edge position data updating condition (current count of upper in-column edges)>(the count of upper in-column edges held in the edge position data holder 508), the edge position data updater 515 supplies the control signal instructing the updating to the line position data holder 104 and the edge position data holder 508.

The line position data holder 104 holds the current line position data from the line position data generator 105 in response to the control signal.

Further, the edge position data holder 508 is updated to the current horizontal array of in-column edge data (11111111) output from the edge determinator 101, in response to the control signal.

When the vertical position data comes to v2, the edge counter 103 will come to count 8 counts or lower in-column edges. When the vertical position data comes to v1, the edge counter 103 (see FIG. 16a) comes to count 8 counts of the upper in-column edges for the first time. At that time, the count of lower in-column edges of the edge counter 103 is 8 and the count of lower in-column edges held in the edge position data holder 50 has the "0" logic level in regard to the lower edge. Accordingly, when these counts are compared with each other, the current count of the edge counter 103 is larger than the count hold in the edge position data holder 508.

Accordingly, the above case meets the edge position data updating condition; (count of current lower in-column edges≧count of lower in-column edges held in the edge position data holder). Then the edge position data updater 515 supplies an update instruction signal to the line holder 104 and the edge position data holder 508.

The line position data holder 104 holds the current line position data from the line position data generator 105 in response to the control signal.

Further, the edge position data holder 508 is updated to the current horizontal array of in-column edge data (11111111) output from the edge determinator 101, in response to the control signal. For instance, as to the vertical position data from then on, when the count of the in-column edges held in the edge position data holder 508 is larger than the count or the in-column edges output from the edge counter 103, the edge position data updater 515 supplies the update instruction signal to the line position data holder 104 and the edge position data holder 508.

When the vertical position data comes to v4, it reaches the upper edge of the caption band. At that time, the count of upper in-column edges output from the edge counter 103 are 4 counts and the horizontal array of upper in-column edge data (00111100).

On the other hand, the count of the upper in-column edges hold in the edge position data bolder 508 are 8 and the count is larger than the count of upper in-column edges at the vertical position of the v4. This case however does not meet the updating condition, so that the edge position data updater 515 does not output the update instruction signal to the line position data holder 104 and the edge position data holder.

When the vertical position data comes to v3, it reaches the lower edge of the caption band.

At that time, the count of lower in-column edges output from the edge counter 103 are 4 counts and the horizontal array of upper in-column edge data is (00111100).

On the other hand, the count of the lower in-column edges held in the edge position data bolder 508 are 8 and the count it larger than the count of lower in-column edges at the vertical position of the v3. This case however does not meet the updating condition, so that the edge position data updater 515 does not output the update instruction signal to the line position data holder 104 and the edge position data holder.

When the line position data has been eventually hold in the line position data holder 104 at the end of one field period, the upper edge of the picture area presents on the vertical position v1. While the lower edge of the picture area presents on the vertical position v2. These data of the upper and lower picture area edges are then supplied to next stages such as the picture edge fluctuation detector 210. The edge horizontal position data to be supplied to the edge data accumulator 213 has a horizontal array of upper in-column edge data (11111111) and a horizontal array of lower in-column edge data (11111111). Accordingly, the true top and bottom lines of the picture can be detected without receiving affections due to the caption band. The operations from then on are same as those in the embodiment mentioned before.

Here, in regard to the edges of the picture area, any one of the top and lower edge lines may be calculated.

A sixth embodiment of the letterbox image detection apparatus according to the present invention will be described in reference to FIGS. 17 through 20.

Figure 17:
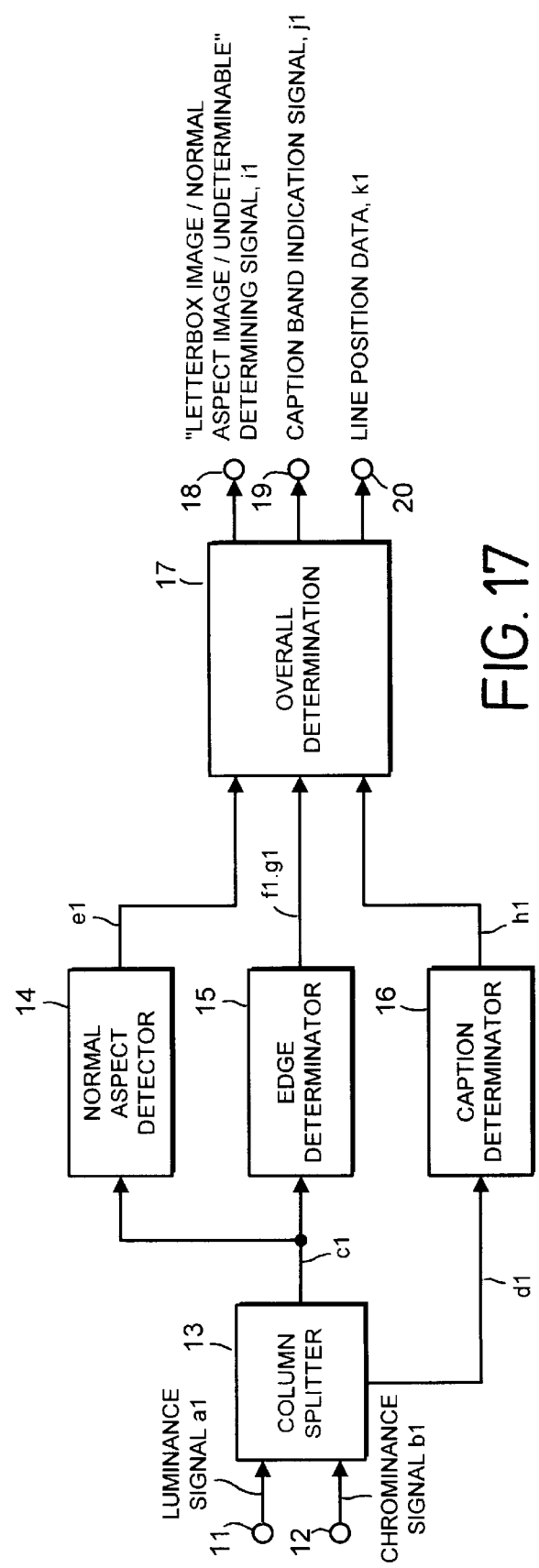
FIG. 17 is a block diagram showing a sixth embodiment of a letterbox image detection apparatus of the present invention.

In FIG. 17, reference numerals 11, 12 denote input terminals to which a luminance signal a1 and a chrominance signal b1 separated from an image signal are supplied from an external input terminal or a channel selector/demodulator circuit. The luminance signal a1 and the chrominance signal b1 led to these input terminals 11, 12 are then supplied to a column splitter 13.

The column splitter 13 splits a screen image into several columns, calculates an average luminance level and an average chrominance level in a division unit and supplies data c1 of this calculated result to a normal aspect image detector 14 and an edge determinator 15. Further, the column splitter 13 detects how many signals seemed to be caption bands are there per division in a split unit and supplies the data d1 to a caption band detector 16. The normal aspect image detector 14 has an average luminance detecting means and an average chrominance level detecting means, and by checking size of an average luminance level and an average chrominance level from the data c1, detects a column containing a picture area and outputs the start point and the end point of picture area as a line position data e1.

The edge determinator 15 is a circuit for detecting a sharp edge between the non-image area and the main image across a screen image, which is a feature of a letterbox image and outputs a sharp edge indicating signal f1 indicating the presence or absence of a sharp edge, and also the position data of upper and lower edges as line position data g1. In this case, the edge determinator 15 has average luminance detecting means and average chrominance level detecting means and furthermore, a holding means for holding information of one or more prior detection results and comparing means for comparing the detection results held in the holding means with the current detection results.

The caption band detector 16 compares the count of signals A that are seemed to be caption bands shown by data d1 supplied from the column splitter 13 with a specified value B and when the count of signals A that are seemed to be caption bands is more than the specified value B, regards that there are caption bands and otherwise, there is no caption band and in the case where there are caption bands, outputs a caption band final line signal h1.

An overall determinator 17 checks the detection results from the normal aspect image detector 14, the edge determinator 15 and the caption band detector 16 to finally determine whether an input image signal is completely a letterbox image signal or a normal aspect image signal. If it is unable to make the determination, the overall determinator 17 determines that the judgment is unable and then generates a "letterbox image/normal aspect image/undeterminable" determining signal i1 from its output terminal 18. Further, when an input signal completely has an feature of letterbox image signal, the overall determinator 17 generates a line position data k1 for providing the picture area start and end position data from its output terminal 20. Further, in case of a letterbox image, it is determined whether there is a caption band outside the main image. When such a caption band is detected, a signal j1 indicating a presence of caption band is output from the output terminal 19. Further, when there is a caption band, the final caption band position data is supplied to an output terminal 20 as the line position data k1.

In such the construction as described above, the column splitter 13 becomes means for splitting the screen image into two or more columns, the normal aspect image detector 14, i.e., first detecting means for detecting a picture area in each column split by the splitting means, the edge determinator 15, i.e., second detecting means for detecting sudden change or image in each column by checking an inter-line correlation in each column split by the splitting means, the caption band detector 16, i.e., third detecting means for detecting a caption band in each column split by the splitting means has means for counting high luminance pixels and low luminance, and the overall determinator 17, i.e., a determinator for determining whether an image signal is a letterbox image signal in response to the detection results from the first through third detecting means.

As an overall operation of a wide aspect TV receiver, if the "letterbox image/normal aspect image/undeterminable" determining signal i1 indicates a complete letterbox image signal when checking the output from the letterbox image detection apparatus, a picture being displayed on the screen is vertically expanded according to the start and end position data of a picture area shown by the line position data k1. Further, if both of the "letterbox image/normal aspect image/undeterminable" determining signal i1 and the caption band determining signal j1 indicate that there is a right letterbox image signal accompanying a caption band, the screen image is vertically expanded to the range wherein the caption band remains on the bottom end of the screen. If the "letterbox image/normal aspect image/undeterminable"

determining signal i1 indicates the complete normal aspect image signal, the vertical expansion is released to the original state. If the "letterbox image/normal aspect image/undeterminable" determining signal i1 indicates the judgment is impossible, the current screen image is maintained.

The operation of the letterbox image detection apparatus will be described in reference to FIGS. 18 through 20.

Figure 18:
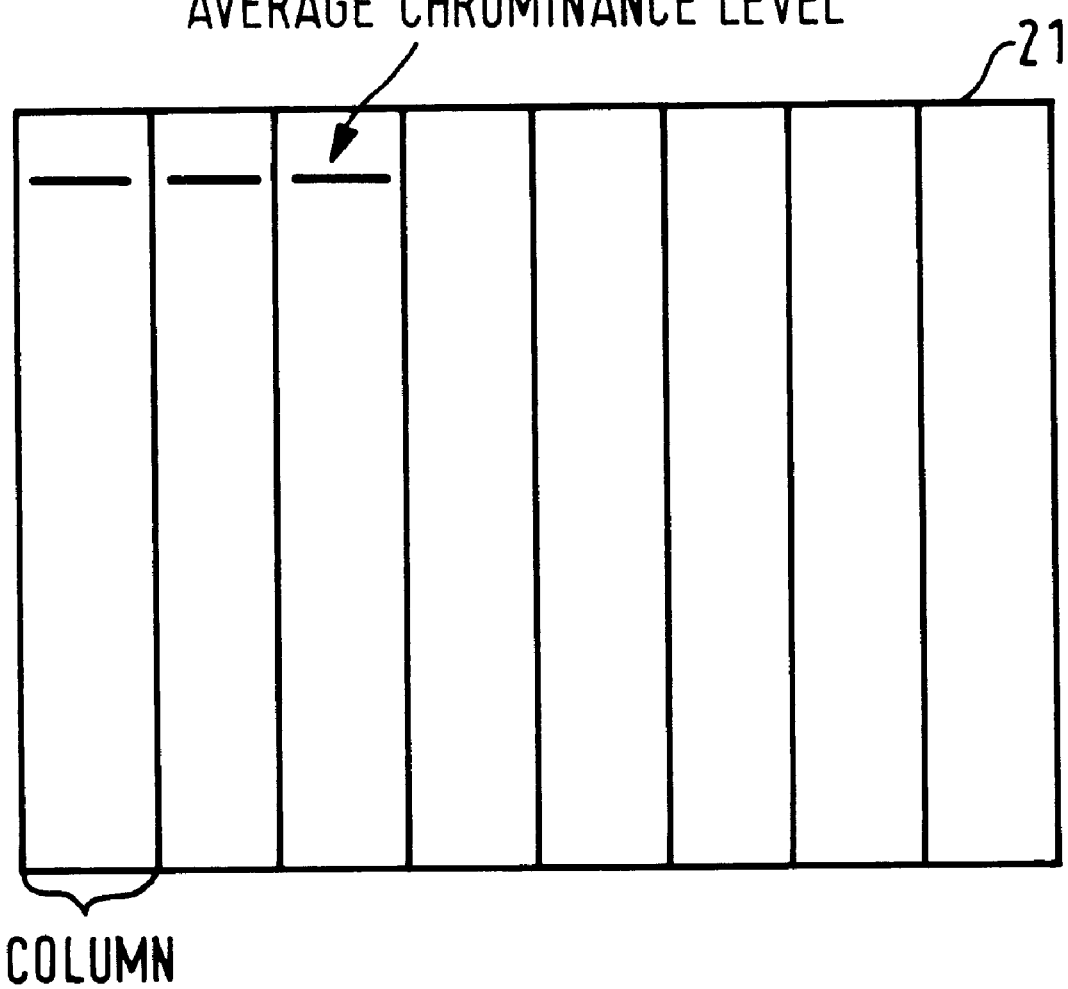
FIG. 18 is an explanatory diagram showing the column splitting or a column splitter shown in FIG. 17.

FIG. 18 is an explanatory diagram showing the column splitting by the column splitter 13 shown in FIG. 17.

The column splitter 13 shown in FIG. 17 splits a screen 21 into several columns (8 columns in case of FIG. 18) and obtains an average luminance level and average chrominance level in each of the split columns.

FIG. 19 is an explanatory diagram showing a first example of the detection by the letterbox image detection apparatus shown in FIG. 17, and FIG. 19a shows the display on the 4:3 aspect screen and FIG. 19b shows the display on the 16:9 aspect screen.

In FIG. 19, it is assumed that the letterbox image detection apparatus is in a case where a scene was changed from a vertically expanded image which was a letterbox image to a scene of the moon in the dark night which was a normal aspect image. This is a scene which could not be determined as a normal aspect image according to conventional detection method subjected for whole of the screen image. In this embodiment, as one horizontal period is split into 8 columns and average luminance and average chrominance levels in every split columns are obtained, an average luminance and chrominance levels for one of the split columns across one screen image exceed a threshold for determining a presence or non-presence of images (threshold for determining a normal aspect image) immediately after the scene of the moon in the dark night appears as shown in FIG. 19a. At the time of exceeding the picture presence/non-presence determining threshold the normal aspect image detector 14 instantly determines that there is a picture area end on that line and gives an instruction to the main microcomputer side of a TV receiver to display the picture at least up to the upper edge of the picture area and therefore, for instance, when a picture is displayed on the 16:9 aspect screen as shown in FIG. 19b, the vertical expansion is released and no image chipping occurs on the displayed picture.

FIG. 20 is an explanatory diagram showing the second example of the detection of the letterbox image detection apparatus shown in FIG. 17, FIG. 20a shows the display on the 4:3 aspect screen and FIG. 20b shows the display on the 16:9 aspect screen.

In FIG. 20, it is assumed that the letterbox image detection apparatus is in a case where a scene was changed from the normal aspect image (the normal aspect display) to a scene appearing the Sun at the center. In the conventional detection method subjected for whole of screen image, such a screen image satisfies the features of a letterbox image and thus erroneously operates. However, in the embodiment of this invention, as one horizontal period is split into 8 columns and average luminance and chrominance levels of each column are obtained, the normal aspect image detector 14 gives such information that "There is no-picture area and a portion seems to be the main image but there is no picture area throughout one horizontal period" to the overall determinator 17. The overall determinator 17 examines this determination result and determining that the picture is seemed not a normal aspect image but does not satisfy the conditions for a letterbox image, outputs a determining impossible signal.

In the case when the determining is not possible, in order to maintain the preceding condition as described above, if a picture is displayed on the 16:9 aspect screen as shown in FIG. 20b, the normal aspect display is continued. So, such an image chipping as seen in the conventional example does not occur.

The explanation of caption band detecting operation will be omitted in this explanation but the caption band detecting performance is increased when a caption band is detected by splitting a screen image into several columns in the caption band detecting operation.

According to the embodiment of the present invention, since the normal aspect image detector 14, the edge determinator 15 and the caption band detector 16 detect a picture area, a sudden change or image and a caption band in each column split by the column splitter 13 by checking an inter-line correlation in each column, it is possible to prevent erroneous operations in the letterbox image signal detection if a scene has changed to an image having entirely a low luminance are close to black level or an image having a surrounding low luminance area close to the black level and a centralized high luminance area. Thus, it is possible to give a favorable impression to user.

A seventh embodiment of the letterbox image detection apparatus according to the present invention will be described in reference to FIG. 21.

Figure 21:
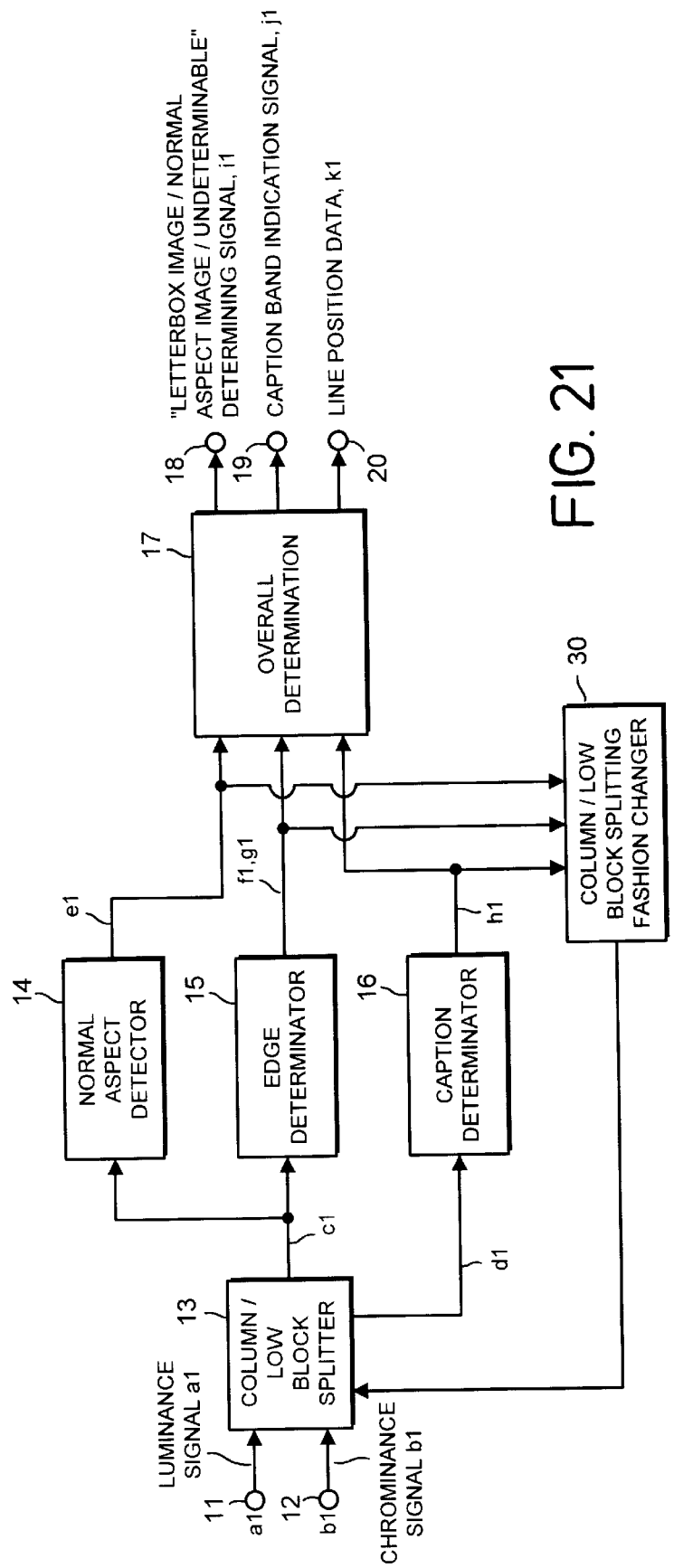
FIG. 21 is a block diagram showing a seventh embodiment of the letterbox image detection apparatus according to the present invention.

In FIG. 21, a column/row block splitting fashion changer 30 is a column splitting fashion changing means and have a column/row block splitter 33, which becomes a splitting means, change to another column splitting fashion. In this case, the column/row block splitting fashion changer 30 controls the column/row block splitter 33 so as to further split a column, that is desirable to see further in detail, to further smaller columns.

The circuit configuration of the column/row block splitter 35 other than this is the same as the column splitter 13 shown in FIG. 17.

Figure 22:
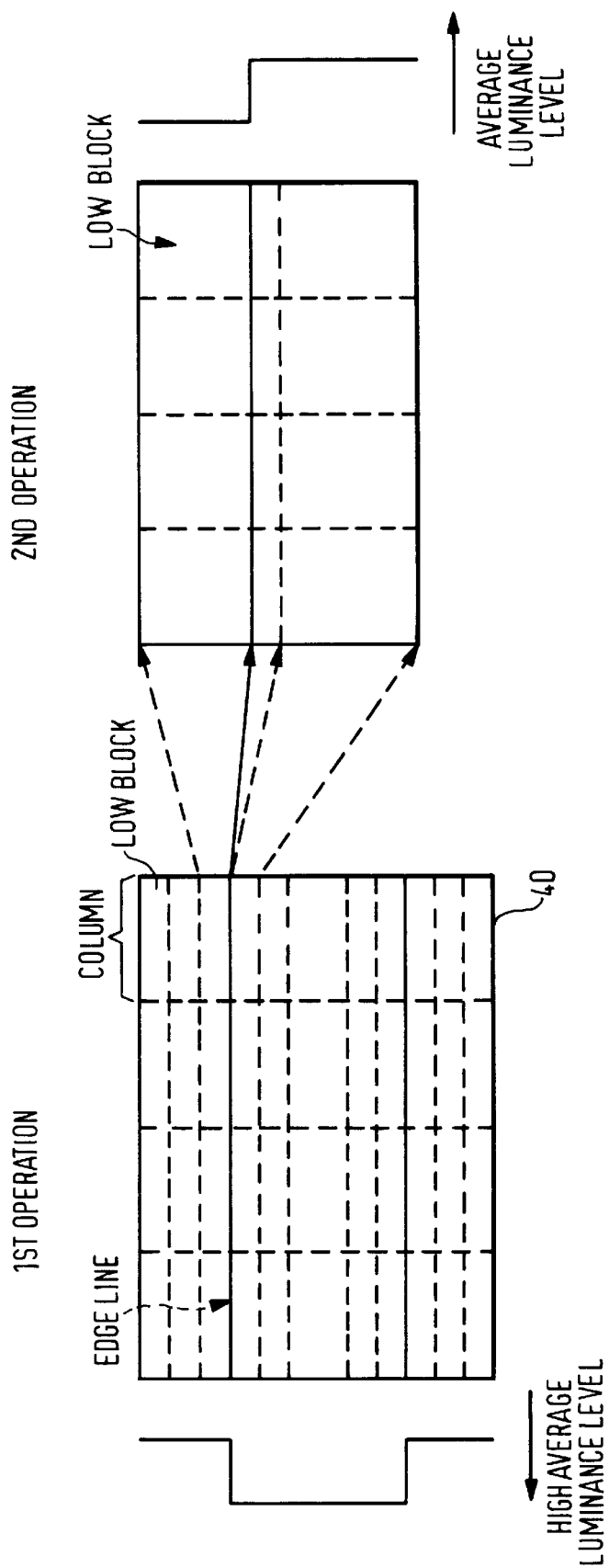
FIG. 22 is an explanatory diagram showing the operation of the embodiment shown in FIG. 21.
Figure 23A:
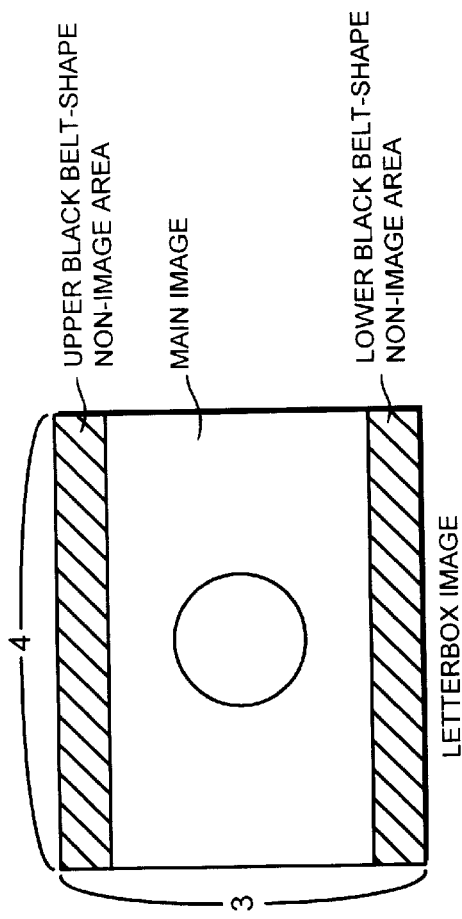
FIG. 23 is an explanatory diagram showing the image display for a video software compatible with a conventional wide aspect TV.
Figure 23B:
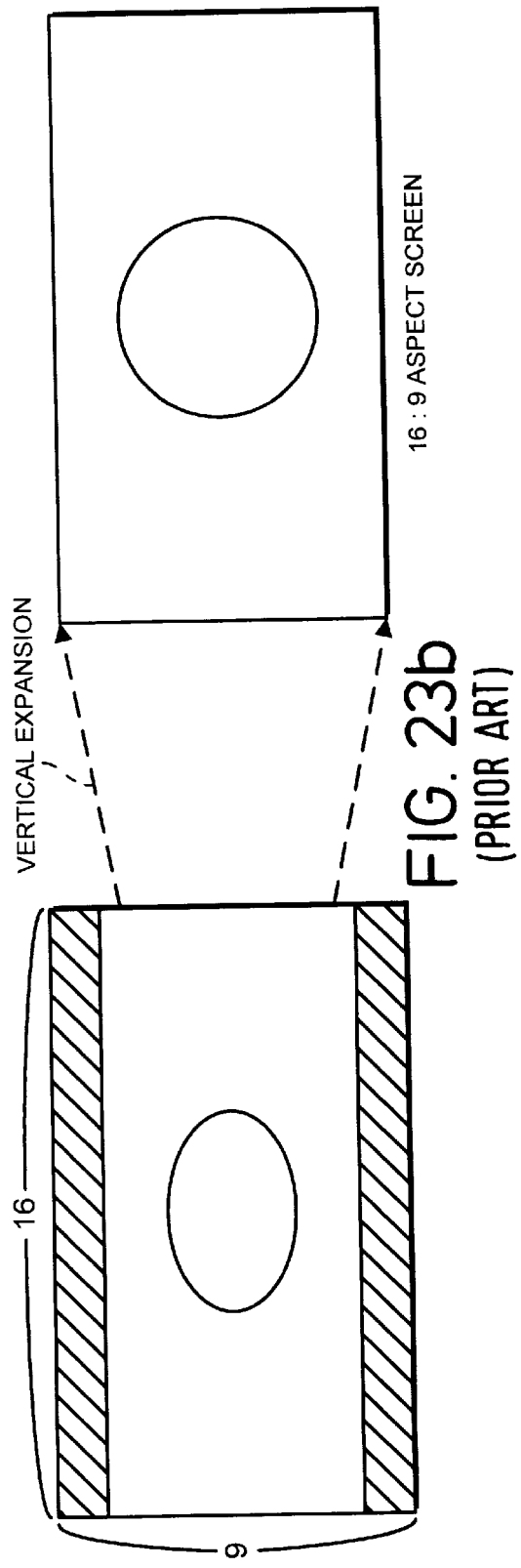
Figure 24A:
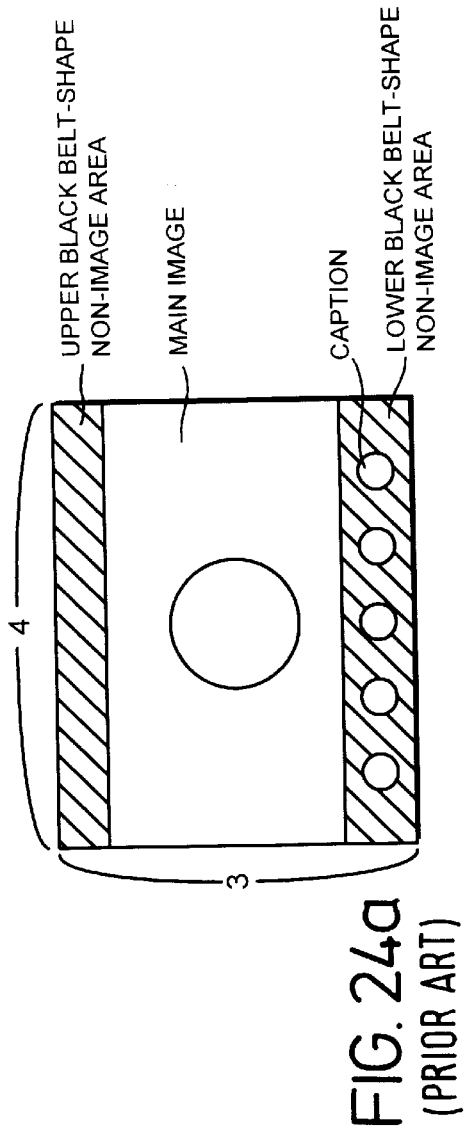
FIG. 24 is an explanatory diagram showing the image display for a video software compatible with a wide aspect TV when there was a caption band in a conventional lower non-picture section.
Figure 24B:
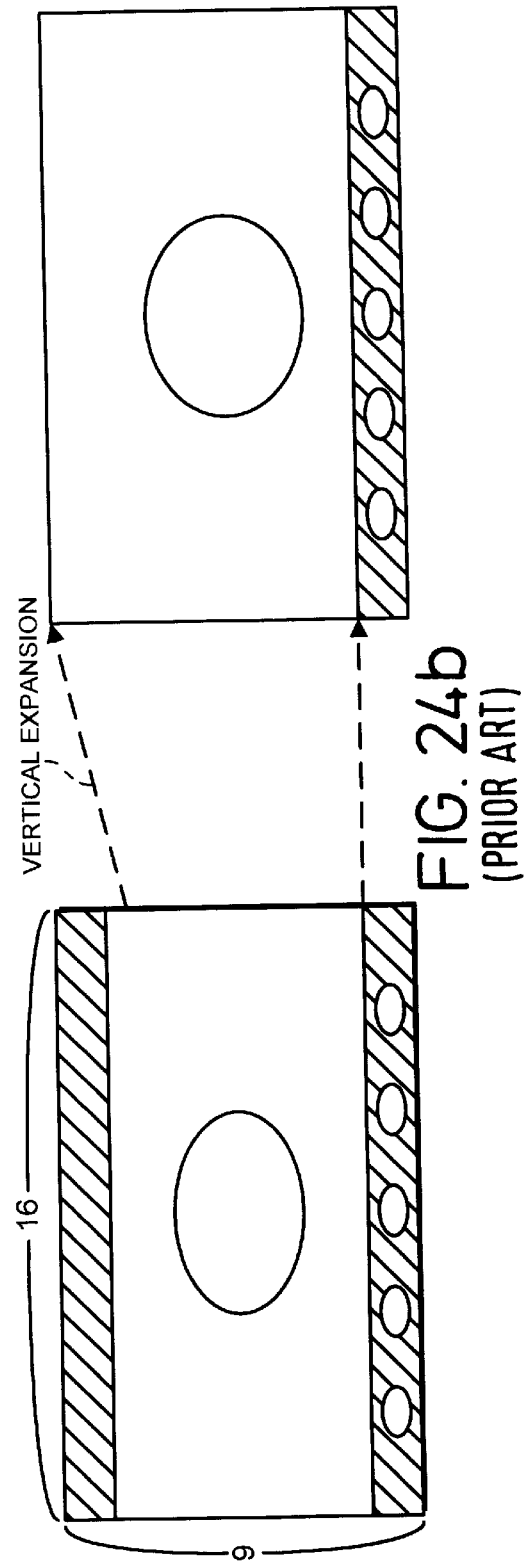
Figure 25:
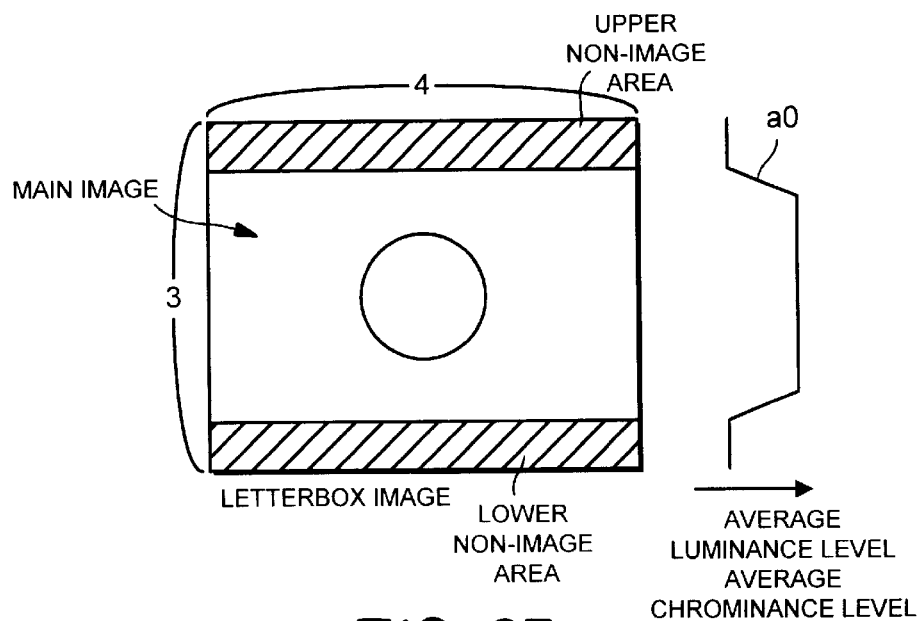
FIG. 25 is an explanatory diagram showing the features of a conventional letterbox image.
Figure 26:
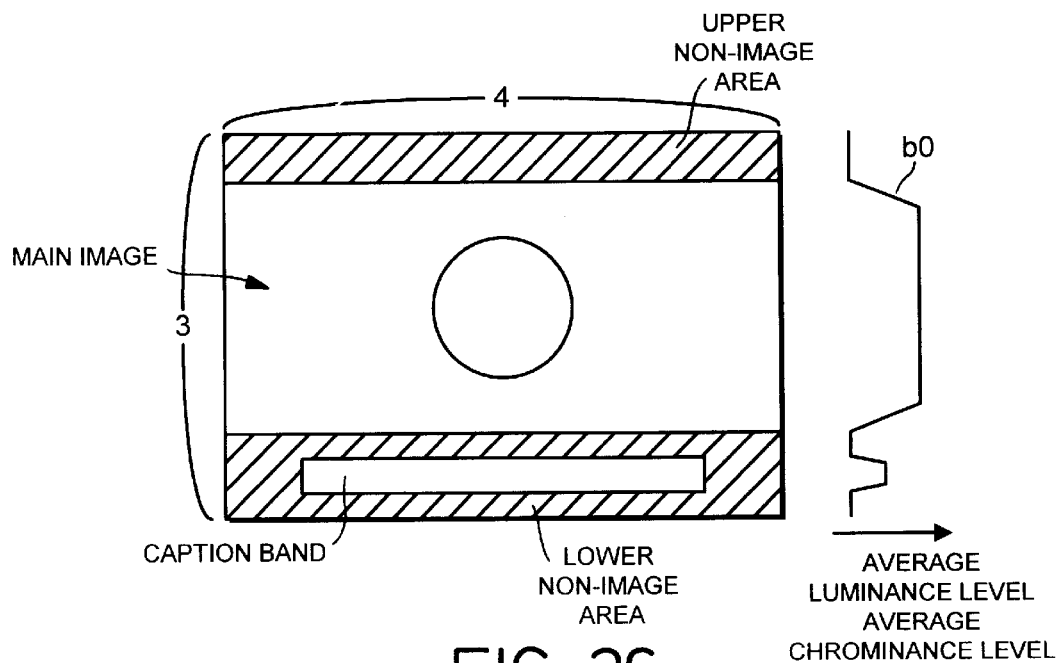
FIG. 26 is an explanatory diagram showing an example of a letterbox image including a conventional caption band.
Figure 29:
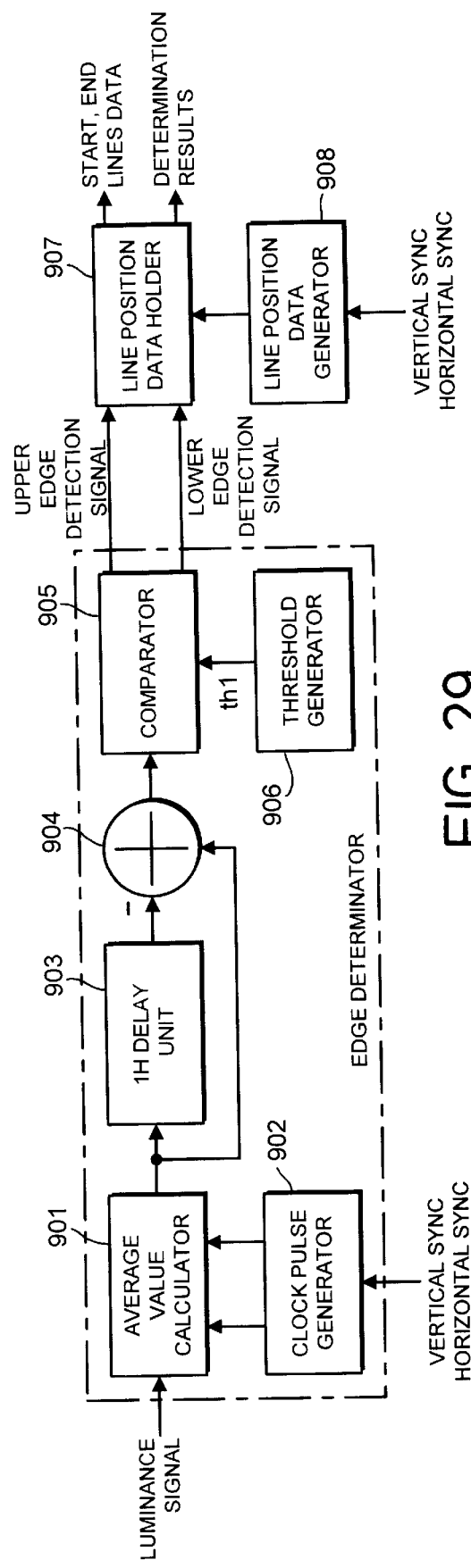
FIG. 29 is a block diagram showing the construction of the conventional letterbox image detection apparatus.

FIG. 22 is an explanatory diagram showing the operation of the embodiment shown in FIG. 21.

In FIG. 22, each column on a screen image 40 is further split into several row blocks in the vertical direction. Initially, by changing the column/row block splitting fashion for coarse row blocks under the control of column/row block splitter 33, the edge determinator 15 carries out a rough check in the vertical direction for seeking in-column edges, i.e., part of picture area ends such as edges of main image and caption bands. After that, a row block wherein any result of the check has occurred is further split into several fine sub-row blocks through the control of the column/row block splitter 33 for fine seeking of picture areas. A similar operation is also applied for detecting the upper and lower edges. By these operations, it is possible to reduce the total amount of data to be processed.

Although, in the embodiments as shown in FIGS. 17 through 22, the normal aspect image detector 14 as the first detecting means, has both of the average luminance level detecting means and the average chrominance level detecting means, the normal aspect image detector 14 is sufficient if it has at least one of the average luminance level detecting means and the average chrominance level detecting means.

Further, although in the embodiments as shown in FIGS. 17 through 22, the edge determinator 15 as the second detecting means has both of the average luminance level detecting means and the average chrominance level detecting means, the edge determinator 15 is sufficient if it has at least one of the average luminance level detecting means and the average chrominance level detecting means.

As described above, the present invention can provide an extremely preferable letterbox image detection apparatus.

According to the present invention as described above, since it detects edges in columns splitting a screen image according to the edge count in the one-horizontal period after determining the presence or absence of edge as to the columns split horizontally, it is able to easily and accurately performs the letterbox image detection which was hard to detect in the conventional way.

Figure 31:
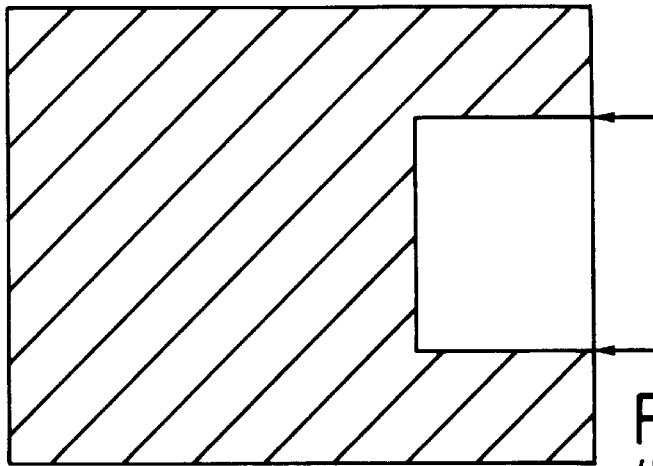
FIG. 31 is a diagram showing the screen image that the letterbox image detection apparatus in FIG. 29 incorrectly detects if it is the letterbox image system or not.
Figure 33:
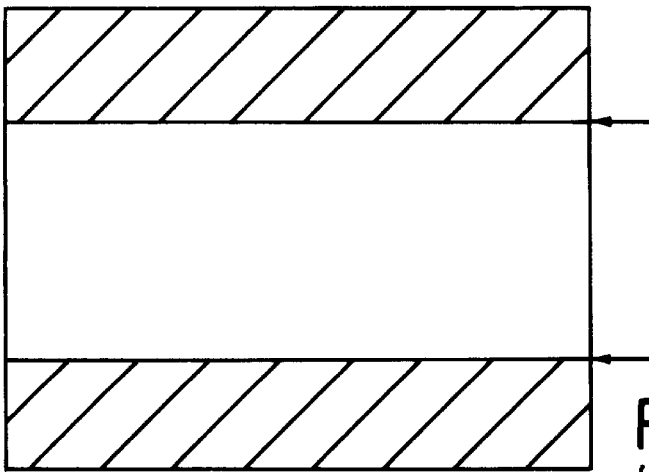
FIG. 33 is a diagram showing the screen image that the letterbox image detection apparatus in FIG. 29 incorrectly detects if it is the letterbox image system or not.

Further, about the screen image shown in FIGS. 31 through 33 it is possible to detect if it is the letterbox image system or not.

According to the present invention, it is possible to prevent the erroneous operation in the letterbox image signal detection when a scene changed to a scene of black luminance level or close to it or when an image of high luminance level is superposed on the center of an image of black luminance level or close to it and it is therefore possible to give a favorable impression to user.

While there have been illustrated and described what are at present considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation or material to the teaching of the present invention without departing from the central scope thereof. Therefor, it is intended that the present invention not be limited to the particular embodiment disclosed as the best mode contemplated for carrying out the present invention, but that the present invention includes all embodiments falling within the scope of the appended claims.

The foregoing description and the drawings are regarded by the applicant as including a variety of individually inventive concepts, some of which may be partially or wholly outside the scope of some or all of the following claims. The fact that the applicant has chosen at the time of filing of the present application to restrict the claimed scope of protection in accordance with the following claims is not to be taken an a disclaimer or alternative inventive concepts that are included in the contents of the application and could be defined by claims differing in scope from the following claims, which different claims may be adopted subsequently during prosecution, for example, for the purposes of a divisional application.

What is claimed is:

1. A letterbox image detection apparatus structured for detecting a letterbox image by detecting a boundary of an image area and a non-image area in order to display only the image area on an entire screen according to a detection result, the displayed image thereby masking the non-image area, the letter box image detecting apparatus comprising:

timing pulse generating means for generating a timing pulse in order to split one screen image into N columns (N is an integer of 2 or more);

image property calculation means for calculating an image property of the N columns;

inter-line difference calculation means for calculating an inter-line difference of the image property for each of the N columns;

edge detecting means for (i) comparing the inter-line difference with a predetermined upper first threshold th1 and (ii) detecting an edge for each column based upon the comparison; and edge position data holding means for holding position data associated with the edge.

2. The letterbox image detection apparatus as claimed in claim 1, wherein the inter-line difference calculation means and the edge detecting means define a first detecting means;

the letterbox image detection apparatus further comprising:

second detecting means for detecting a caption band in each of the N columns; and an overall detector for detecting a letterbox image signal in response to detection results of the image property calculation means, the first detecting means and the second detecting means.

3. A letterbox detection apparatus as claimed in claim 2, wherein the image property calculation means has at least one of a average luminance detecting means and an average chrominance level detecting means.

4. A letterbox image detection apparatus as claimed in claim 2, wherein the first detecting means has at least one of the average luminance detecting means and the average chrominance level detecting means and further has a holding means for holding more than one information of the detection results in the past and a comparing means for comparing the detection results held in this holding means with the current detection results.

5. A letterbox image detection apparatus as claimed in claim 2, wherein the second detecting means has means for counting pixels of high luminance level and the pixels of low luminance level.

6. A letterbox image detection apparatus structured for detecting a letterbox image by detecting a boundary of an image area and a non-image area in order to display only the image area on an entire screen according to a detection result, the displayed image thereby masking the non-image area, the letter box image detecting apparatus comprising:

timing pulse generating means for generating a timing pulse in order to split one screen image into N columns, N being an integer of 2 or more;

image property calculation means for calculating an image property of the N columns;

inter-line difference calculation means for calculating an inter-line difference of the image property for each of the N columns; and edge detecting means for (i) comparing the inter-line difference with a predetermined upper threshold and (ii) detecting an edge for each column based upon the comparison.

* * * * *